United States Patent [19]
Mati et al.

[11] 4,367,465
[45] Jan. 4, 1983

[54] GRAPHICS LIGHT PEN AND METHOD FOR RASTER SCAN CRT

[75] Inventors: Nicholas P. Mati; Frederick J. Porter, both of Loveland; Robert W. Fredrickson, Fort Collins, all of Colo.

[73] Assignee: Hewlett-Packard Company, Palo Alto, Calif.

[21] Appl. No.: 137,103

[22] Filed: Apr. 4, 1980

[51] Int. Cl.³ .............................................. G09G 1/16
[52] U.S. Cl. .................................... 340/707; 340/712
[58] Field of Search ............... 340/707, 708, 706, 712, 340/365 L; 178/18–20

[56] References Cited

U.S. PATENT DOCUMENTS

| | | | |
|---|---|---|---|
| 3,413,515 | 11/1968 | Haring | 340/707 |
| 3,512,037 | 5/1970 | Eckert et al. | 340/707 |
| 3,786,479 | 1/1974 | Brown et al. | 340/708 |
| 3,793,481 | 2/1974 | Ripley et al. | 340/707 |
| 4,093,947 | 6/1978 | Habeger, Jr. et al. | 340/708 |
| 4,117,471 | 9/1978 | Schlig | 340/708 |

*Primary Examiner*—Marshall M. Curtis
*Attorney, Agent, or Firm*—Edward L. Miller

[57] ABSTRACT

A graphics system for a raster scan CRT implements a light pen tracked by a cursor. Hits corresponding to the cursor are distinguished from those corresponding to background data by a selective interlacing technique. A threshold level shifting technique providing accurate measurement of a horizontal component of the cursor allows accurate prediction of the location of the center of the field of view during the next frame.

24 Claims, 17 Drawing Figures

CENTER ESTIMATION DURING INTERLACE WITH DATA FOR ODD NUMBERED SCAN LINES AND HITS ON EVEN NUMBERED SCAN LINES SUPPRESSED

TRACKING CURSOR
SUPERIMPOSED ON
BACKGROUND IMAGE

DISPLAYED INFORMATION GENERATES ONE HIT
PER SCAN LINE

DATA IN FIELD OF VIEW, CAUSING
INCORRECT CENTER ESTIMATION

CENTER ESTIMATION DURING INTERLACE WITH DATA FOR ODD NUMBERED SCAN LINES AND HITS ON EVEN NUMBERED SCAN LINES SUPPRESSED

CENTER ESTIMATION DURING INTERLACE WITH DATA FOR EVEN NUMBERED SCAN LINES AND HITS ON ODD NUMBERED SCAN LINES SUPPRESSED

SINGLE DOT FIELD OF VIEW

RELATIONSHIP BETWEEN THE SHAPE AND LOCATION OF THE SINGLE DOT FIELD OF VIEW AND THE SHAPE AND LOCATION OF THE HORIZONTAL LINE FIELD OF VIEW.

FIG. 12 BLOCK DIAGRAM OF THE CRT DISPLAY UNIT AND THE LIGHT PEN

INTERRUPT SERVICE ROUTINE

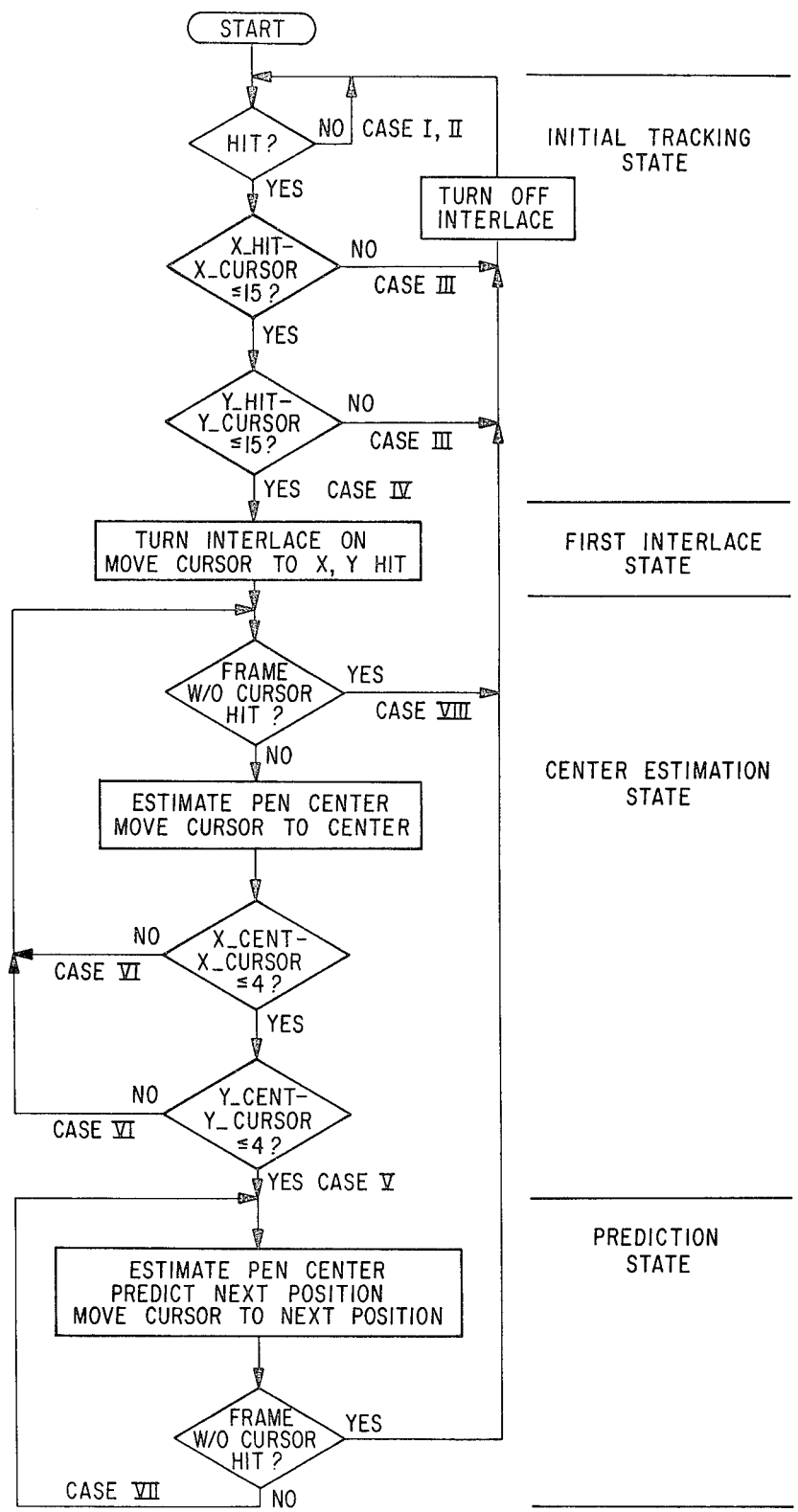
TRACKING ACQUISITION ALGORITHM   FIG. 14

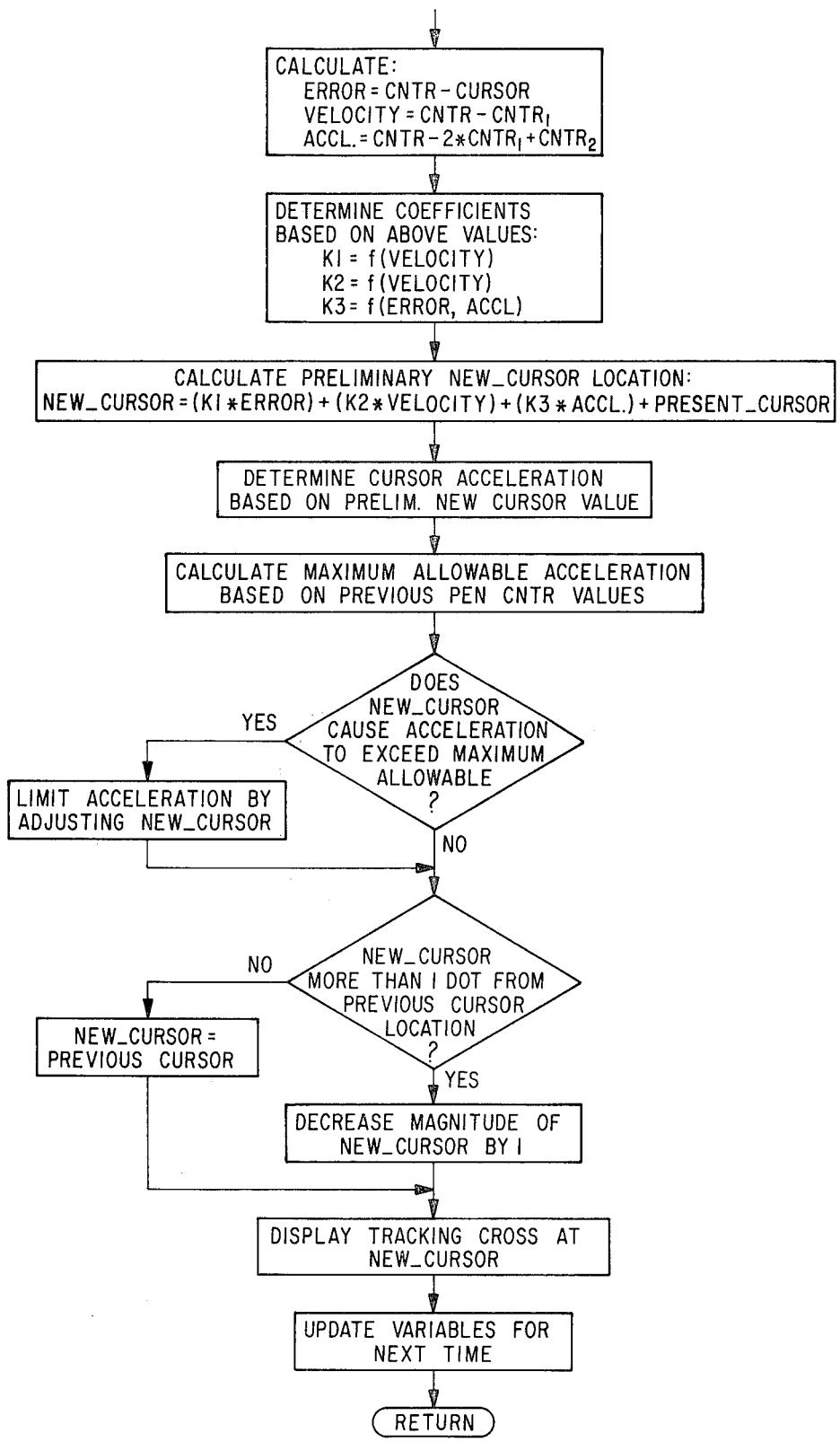
PREDICTION ALGORITHM FIG. 15

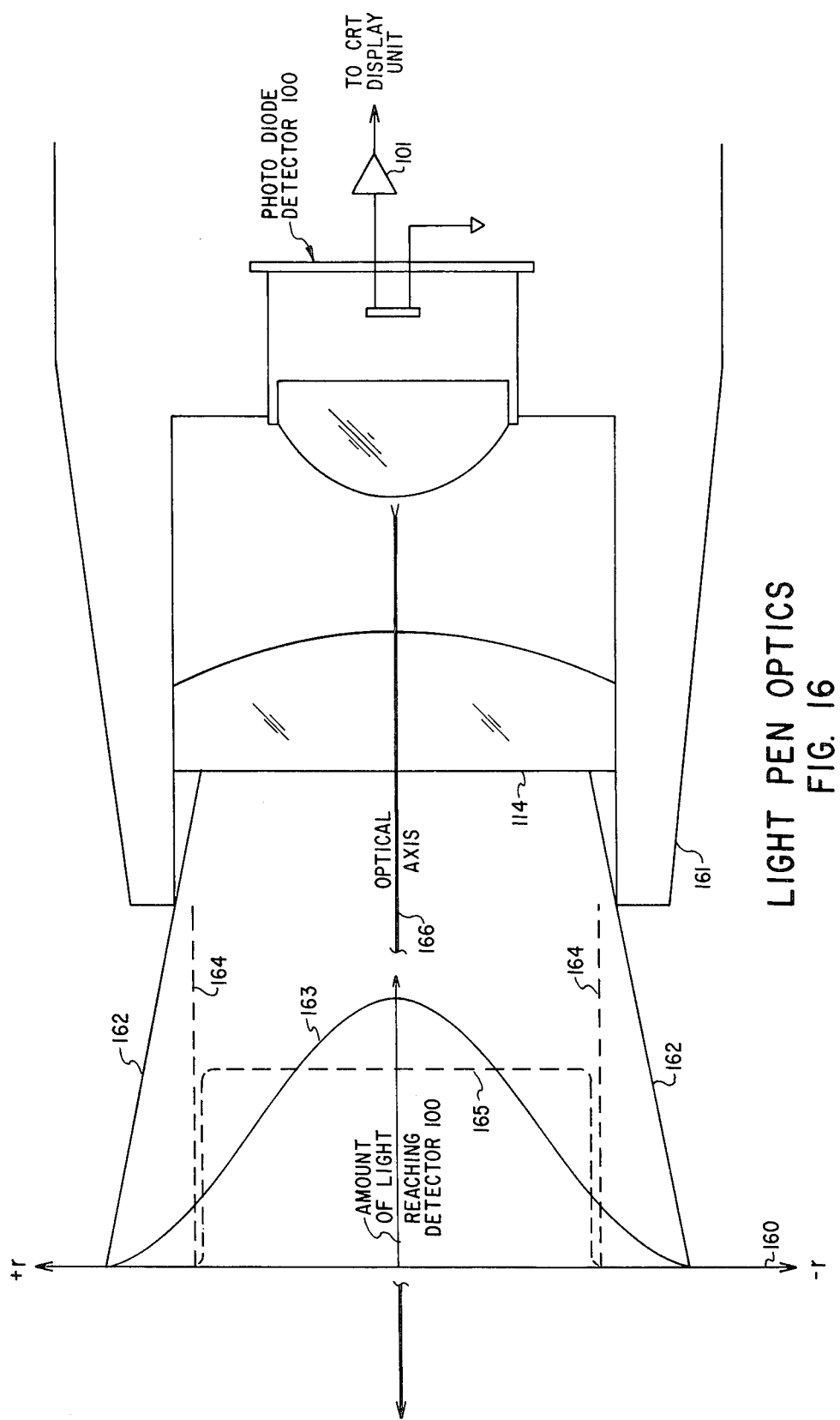

GRAPHICS LIGHT PEN AND METHOD FOR RASTER SCAN CRT

BACKGROUND AND SUMMARY OF THE INVENTION

Until the present invention the only light pen systems that were usable for high resolution and high accuracy graphics work were those implemented with vector writing CRT's. Raster scan CRT systems were limited to low accuracy picking, such as in making menu selections. It would be desirable if the performance of a vector writing light pen system could be obtained in a raster scan system, with its relatively lower cost and level of drive circuit complexity.

It is conventional to track a light pen with a cursor. However, it has heretofore been infeasible to accurately and with high resolution track a light pen in a raster scan system because the comparatively long decay time of the CRT phosphor effectively means that there can only be one "hit" (detected output from the light pen) per scan line. In a raster scan system there might be little or no temporal separation between pixels that are user data and pixels that are part of the cursor. Thus, an initial hit caused by user data in a scan line also containing a potential hit for the cursor "absorbs" or prevents that potential hit on the cursor. Without accurate hits from the cursor the system cannot accurately track the light pen with that cursor, nor can the user accurately pick locations upon the screen.

A preferred embodiment of the present invention solves this problem by maintaining a small region of interlacing around the cursor. Within the region of interlacing the cursor is displayed in full each frame, while the user's data is divided into even and odd scan lines. Within the region of interlacing user data on odd scan lines is blanked every other frame, while user data on even scan lines is blanked during the intervening frames. During the blanking of odd numbered scan lines the only hit on an odd numbered scan line will be one corresponding to the cursor, with a similar correspondence for even numbered scan lines during the intervening frames. When taking hits for odd numbered scan lines during a frame any hits on even numbered scan lines are suppressed, and vice versa. Thus, each frame can provide truthful cursor hit information from which can be calculated the relative displacement between the center of the cursor and the center of the field of view for the light pen, so that the cursor may be made to track the movements of the pen.

In conjunction with the interlacing technique mentioned above a threshold shifting technique raises the minimum intensity threshold needed for light reaching the pen to create a hit. The shifting to a higher level is done when a hit is expected from a horizontal component of the tracking cursor. This counteracts the build-up of light within the pen's field of view whenever a horizontal line is being written within that field of view. That allows the accurate measurement of where the left-hand edge of the horizontal component of the cursor intersects the field of view, even though there may be a considerable length of horizontal line to the left of the field of view (assuming a left-to-right direction of scanning).

The desirable result produced by the threshold shifting technique is potentially adversely affected by changes in display intensity and by changes in the distance from the light pen to the faceplate of the CRT. These adverse effects are avoided by focusing the light pen optics at infinity and by providing it with a divergent viewing region whose area increases as the distance from the light pen to the CRT increases. Such a light pen has a family of optical attenuation curves that are generally sinusoidal in shape. That, in turn, allows certain single dot type and horizontal line type fields of view to vary together in simultaneous proportion as functions of display intensity and pen-to-screen distance. That simultaneous proportional variation is highly desirable in a system that performs threshold shifting to obtain accurate measurements upon horizontal lines.

BRIEF DESCRIPTION OF THE DRAWINGS

FIG. 14 is a diagram of an algorithmic process for tracking the light pen of FIG. 1 with the cursor of FIG. 2, and shows various conditions under which the interrupt service routine of FIG. 13 is invoked.

FIG. 15 is a detailed flowchart of a prediction step in the flowchart of FIG. 13.

FIG. 16 is pictorial representation of the optical properties of the light pen in the embodiment of FIG. 1.

DESCRIPTION OF THE PREFERRED EMBODIMENT

Figure 1:
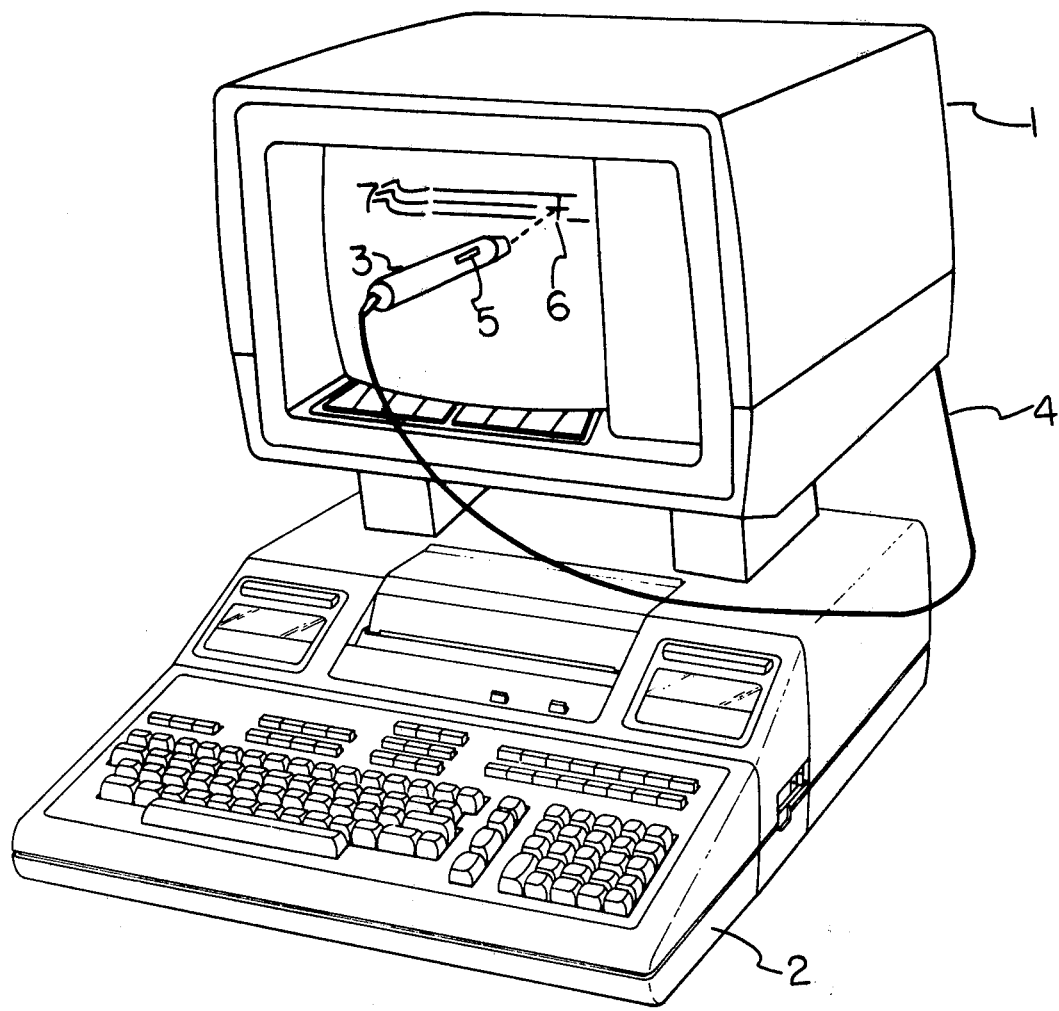
FIG. 1 is a front perspective view of an apparatus constructed in accordance with a preferred embodiment of the invention, and including a computer, a raster scan CRT display unit and a light pen.

FIG. 1 shows a raster scan graphics system constructed according to a preferred embodiment of the invention. The system includes a CRT display unit 1 operating in conjunction with a computer 2. In a preferred embodiment the CRT display unit 1 incorporates a color CRT whose raster is formed in a single frame by consecutively scanning 455 scan lines each 720 dots long. A light pen 3 is connected to the graphics system by a shielded cable 4. The light pen 3 contains a photosensitive element that creates electrical signals in response to receiving light generated by the CRT display unit 1. The position of the light pen 3 on or near the faceplate of the CRT is determined by correlating signals from the pen with the information displayed upon the screen of the CRT display unit 1. The displayed information may include user data of alphanumeric characters of all types and sizes and may also include graphical images such as regions and straight and curved lines. Numeral 7 in FIG. 1 denotes generally user data of whatever type.

The light pen 3 may be used in either of nontracking or tracking modes to "pick" selected features of the user data 7. By pressing a pushbutton switch 5 upon the light pen 3 the user can inform the graphics system that the light pen 3 designates a desired location and that a selected operation is to be performed. Such operations may include drawing or erasing lines, identifying features of a graphics image, editing text, etc. The nontracking mode is limited to picking large scale features, as in menu selection. The tracking mode is used to pick individual pixels, whether illuminated or not, with high accuracy and high resolution. The technique to be described affords sufficient resolution and stability to allow quick and accurate selection among adjacent pixels of displayed information. In the preferred embodiment a pixel is a single dot.

In the tracking mode the displayed information also includes a tracking cursor 6 that preferably has the shape of a cross whose elements are aligned with the horizontal and vertical axes of the CRT display unit 1. By positioning the light pen 3 the user may align the center of the tracking cursor 6 with any selected location upon the screen. Through the use of an interlacing technique discussed below the detection signals corresponding to the tracking cursor 6 can be distinguished from those corresponding to the user data 7, even when the tracking cursor 6 is arbitrarily superimposed upon that user data 7. Furthermore, a prediction technique allows the tracking cursor 6 to smoothly follow rapid movements of the light pen 3 with a high degree of accuracy, even when the light pen 3 is as much as two centimeters away from the faceplate of the CRT.

In general, the CRT display unit 1 and the computer 2 form two complementary parts of a servo-like loop. In the tracking mode the CRT display unit 1 displays the user data 7 and the tracking cursor 6, and determines which signals from the light pen 3 correspond to the tracking cursor 6. It makes that coordinate information available to the computer 2. The computer 2 uses the coordinate information to determine the misalignment between the center of the field of view for the light pen 3 and the center of the tracking cursor 6. From that the computer 2 can predict the proper coordinates for the tracking cursor 6 during the next frame of the display. The computer 2 sends those coordinates to the CRT display unit 1 in time for the tracking cursor to be displayed at the new location during the next frame. It also writes the predicted coordinates into designated places in memory that are accessible through statements executed in the user's programming language.

The general operation of the pushbutton 5 is the same for both the tracking and nontracking modes of operation. By means of conventional programming practices the pushbutton 5 invokes a subroutine supplied by the user. That subroutine causes the execution of a selected graphics operation, using the data currently in the places in memory designated to hold the coordinate data detected by the light pen 3. The user performs graphics operations whose descriptions are written in the user's programming language.

The CRT display unit 1 and the light pen 3 operate in a context that includes a graphics firmware system that resides in the computer 2. The graphics firmware system can support several different graphics input and graphics output devices. A graphics device must be designated for each of the graphics input and graphics output functions. To use the light pen 3 the following statement must first be executed:

GRAPHICS INPUT IS "LIGHT PEN"

The GRAPHICS INPUT statement causes the computer 2 to instruct the CRT display unit 1 to request an interrupt after the light pen 3 has detected signals of interest, at which time certain registers within the CRT display unit 1 will have useful data within them. The GRAPHICS INPUT statement also specifies and enables an interrupt service routine that reads the data from those registers and processes it according to certain conditions, such as whether or not the tracking cursor 6 is being displayed, and if it is, whether or not it is actually tracking the light pen 3.

To use the light pen 3 in the nontracking mode for picking large scale features without the aid of the tracking cursor 6 it is sufficient to execute just the GRAPHICS INPUT statement shown above. In the nontracking mode the overall operation of the graphics system is as follows. The CRT display unit 1 converts the responses from the light pen 3 into raw coordinate data, and requests an interrupt. The interrupt service routine places these coordinates into designated places in memory that can be accessed when the pushbutton 5 is actuated.

To use the light pen 3 in the tracking mode for picking individual pixels with the aid of the tracking cursor 6 an additional statement must also be executed:

POINTER <X coordinate>, <Y coordinate>

The POINTER statement specifies an initial location within the raster for the tracking cursor 6. This renders the tracking cursor 6 visible and positions it at that location. In the tracking mode the overall operation of the graphics system is as follows. The computer 2 sends the CRT display unit 1 address information for the tracking cursor 6. At the designated location the CRT display unit 1 incorporates the tracking cursor 6 into the other data of the raster. The CRT display unit 1 converts the responses from the light pen 3 into raw coordinate data whose significance depends upon whether or not the tracking cursor 6 is actually within the field of view of the light pen 3.

Assume that the tracking cursor 6 is within the field of view. The CRT display unit 1 registers three raw partial coordinate values related to the tracking cursor 6 and requests an interrupt. When the interrupt is serviced the computer 2, using the already known location of the tracking cursor 6, estimates the coordinates for the center of the field of view, predicts in light of previous such coordinates the most likely coordinates for the next location of the center of the field of view, and sets the tracking cursor 6 address information to represent the predicted coordinates. The predicted coordinates are also written into the places in memory designated for that purpose, so that they may be used during a user specified operation. The process begins again for the next frame as the computer 2 sends new address information for the tracking cursor 6 to the CRT display unit 1.

Now assume that the tracking cursor 6 is not within the field of view. This could happen for any of the following reasons. The light pen 3 might never have been moved to the vicinity of the tracking cursor 6 following execution of the POINTER statement. Or, the tracking cursor 6 may have been already tracking the light pen 3 but the light pen 3 may have been either removed from the CRT altogether, or moved too rapidly to permit tracking to continue. In such cases the CRT display unit 1 registers either noncursor data or no new data, as is appropriate. In each case the interrupt service routine can determine from the nature of the data what has happened.

In the case where the light pen 3 is providing noncursor data the detected coordinates are still written into the designated places in memory so that nontracking mode picking can still be performed. The tracking cursor 6 remains on display at its previous location until either the field of view intersects the tracking cursor 6 and tracking commences, or until a POINTER statement moves the location of the tracking cursor 6.

In the case where the light pen is providing no responses, neither the location of the tracking cursor 6 nor the coordinates in the designated places in memory are updated by the interrupt service routine.

In both cases, however, the prediction algorithm for the next location of the tracking cursor 6 is set to reflect the condition "no previous history".

It will be apparent to those skilled in the art that various divisions of labor between the circuitry within the computer 2 and the CRT display unit 1 fall within the scope of the invention, as do various divisions of labor between any such circuitry and internal firmware executed by the computer 2.

Figure 2:
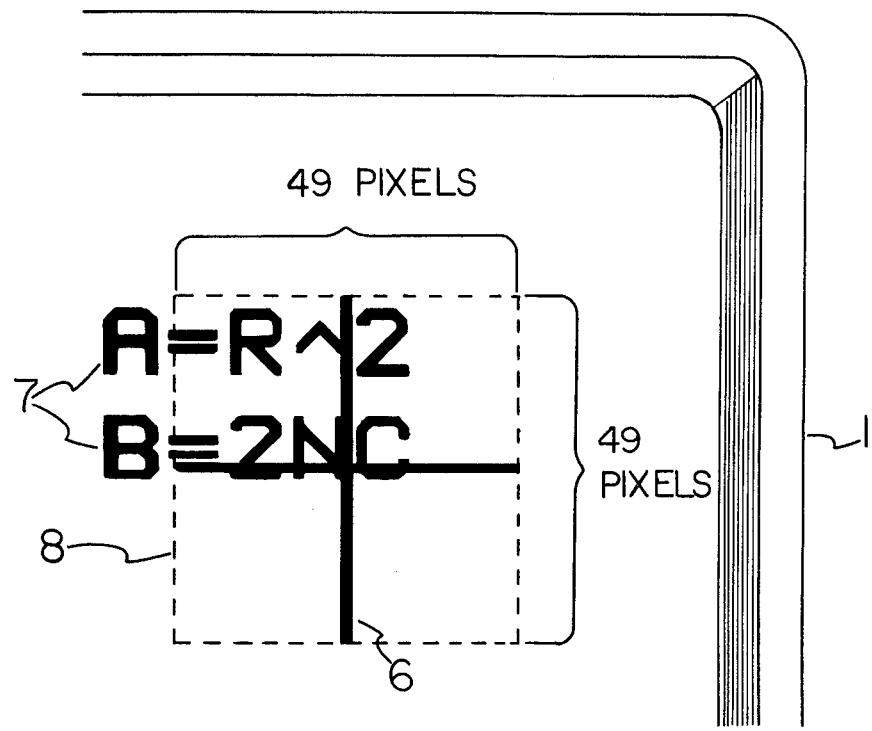
FIG. 2 is an enlarged view of a presentation upon the screen of the CRT display unit of FIG. 1, showing among some arbitrary user data a tracking cursor and a surrounding region of interlacing, each of a preferred size and shape.

In FIG. 2 the tracking cursor 6 is shown in greater detail. The cursor itself has two perpendicular segments each one pixel wide and forty-nine pixels long. The two perpendicular segments intersect each other at their mid-points, and are respectively oriented parallel to the horizontal and vertical axes of the CRT display unit 1. In FIG. 2 the tracking cursor 6 is shown superimposed upon arbitrary alphanumeric data 7. In particular, the center of the tracking cursor 6 is located in the vicinity of the lower right-hand corner of an "N". The dotted line 8 denotes a square region having the same size and center as the tracking cursor 6, and within which a process of even/odd scan line interlacing by alternating frames occurs for the user data 7. The dotted line in FIG. 2 appears there for illustrative purposes only, and does not appear on the screen of the CRt. The tracking cursor 6 is not interlaced; it is fully displayed each frame.

Figure 12:
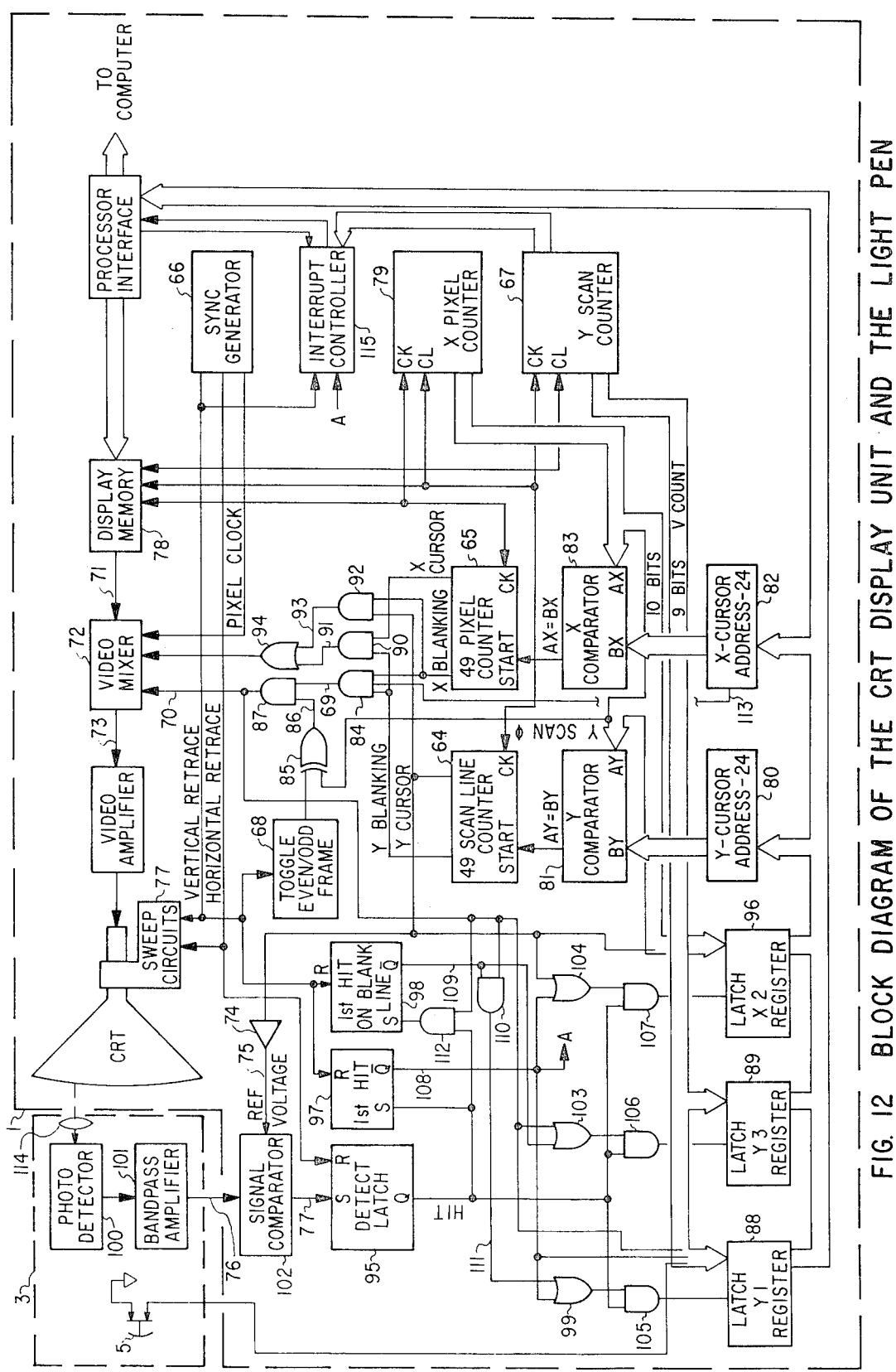
FIG. 12 is a block diagram of the raster scan CRT display unit of FIG. 1.

Referring briefly to FIG. 12, the light pen 3 is an assembly including a photo detector 100 whose output is amplified by a bandpass amplifier 101 and sent by a line 76 (corresponds to the cable 4 in FIG. 1) to the input of a signal comparator 102 located in the CRT display unit 1. A reference voltage 75 is also supplied to the signal comparator 102, which produces an output on line 77 whenever the signal on line 76 exceeds a threshold established by the reference voltage 75. An output from the signal comparator 102 on line 77 is called a "hit".

Figure 3:
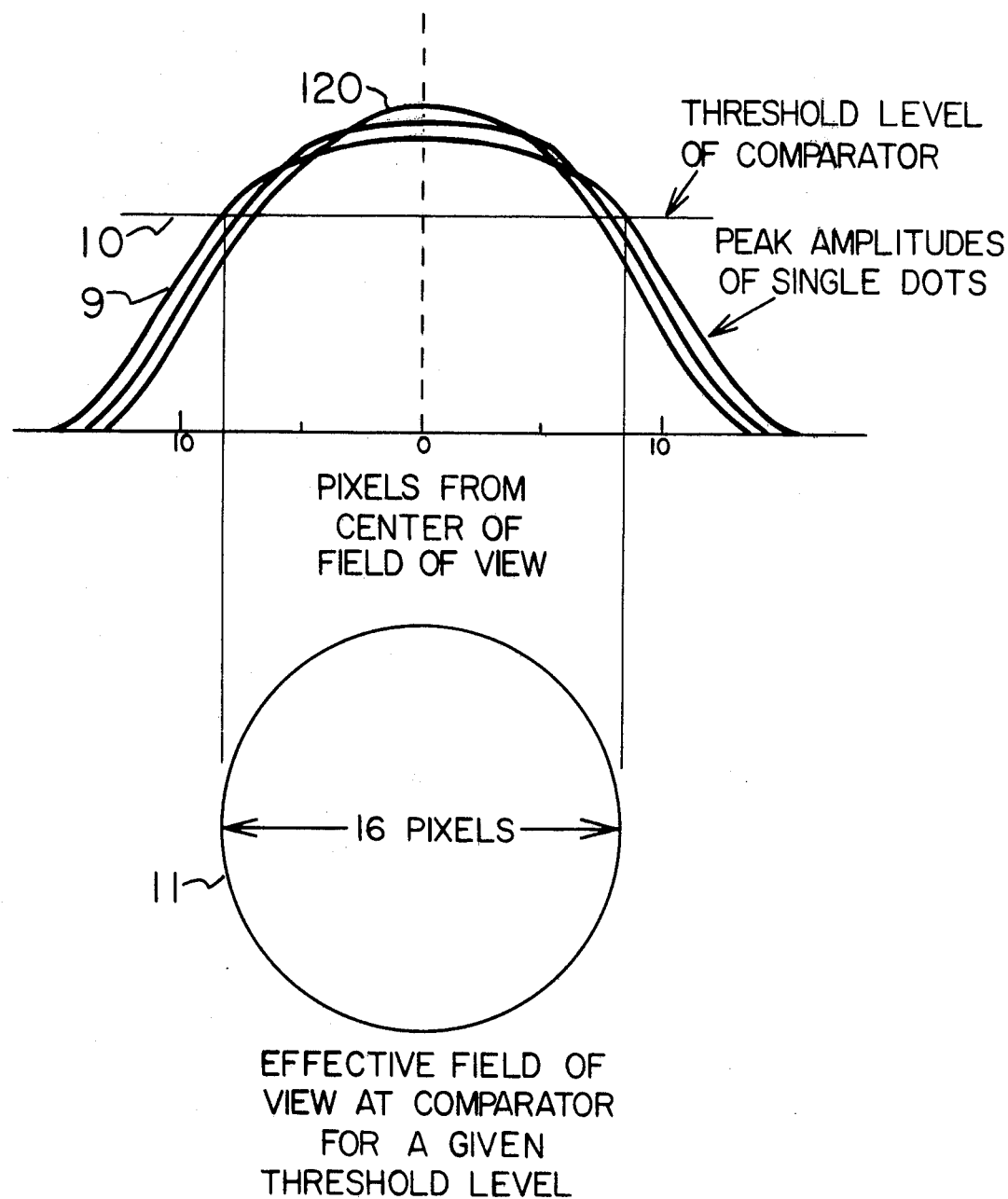
FIG. 3 illustrates the concept of single dot field of view for the light pen of FIG. 1.

FIG. 3 shows the general shape of a family of relative optical attenuation curves for the light pen 3. One method for obtaining the curves for this family will be discussed in connection with FIG. 9. Notice that the curve 9 shows the peak amplitude for a solitary dot (i.e., the only dot) at varying distances from the center of the field of view for the photo detector 100. The distance from the photo detector 100 to the faceplate of the CRT is assumed to be constant for any particular curve, such as that designated by the numeral 9. Curve 120 represents a lesser such distance than does curve 9. Suppose the reference voltage 75 establishes the threshold indicated by numeral 10. Such a threshold produces a circular effective field of view 11, which in the example shown has a diameter of 16 pixels. The significance of this is that any solitary pixel, located within an eight pixel radius about the center of the field of view, will create a hit. A field of view such as that denoted by the numeral 11 is termed a "single dot field of view". The actual diameter of a signal dot field of view is, in part, a function of the distance of the light pen 3 from the faceplate of the CRT. In the present embodiment the diameter of the single dot field of view is approximately thirty pixels at a distance of one inch. When the light pen 3 is pressed against the faceplate of the CRT the minimum diameter of the single dot field of view (at minimum display intensity) is eighteen pixels.

Figure 4:
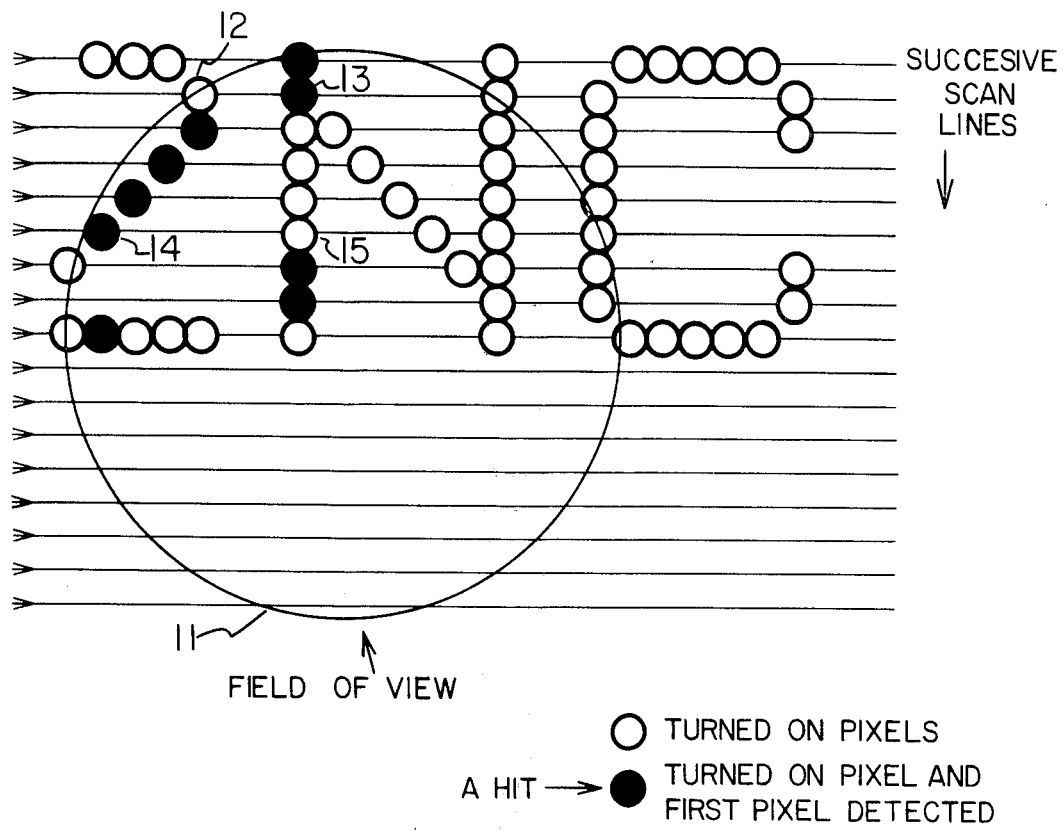
FIG. 4 illustrates a simplified relationship between the single dot field of view of FIG. 3 and the property of one hit per scan line for the light pen of FIG. 1.

FIG. 4 shows the single dot field of view 11 of FIG. 3 superimposed over the alphanumeric data 7 of FIG. 2. Temporarily assume that pixels which have at least thirty percent of their area outside the single dot field of view 11 will not generate a hit. Thus, the pixel indicated by the numeral 12 will not generate a hit. (The assumption is not always true, but is temporarily useful. The actual state of affairs is discussed in connection with FIGS. 9 and 10.) The pixel denoted by the numeral 13 will generate a hit, as will the pixel denoted by the numeral 14. Note, however, that the pixel denoted by the numeral 15 does not generate a hit, for the reason that *there can be only one hit per scan line*. The response of the photo detector 100 is primarily a function of the light incident upon it. The response of the phosphor in the CRT has a rate of decay too slow to permit more than one hit per scan line. The phosphor has a relatively long decay time compared to the time between pixels. For example, P22 phosphor has a decay time constant of 8.7 usec. But for a CRT displaying pixels at a 30.0 MHz rate even a single decay time constant would be equivalent to 261 pixels, or over ten times the diameter of the example single dot field of view. As a result, once a pixel in the field of view creates a hit, there is not sufficient time for the detection of another turned on (i.e. illuminated) pixel within the field of view and on the same scan line.

Figure 5:
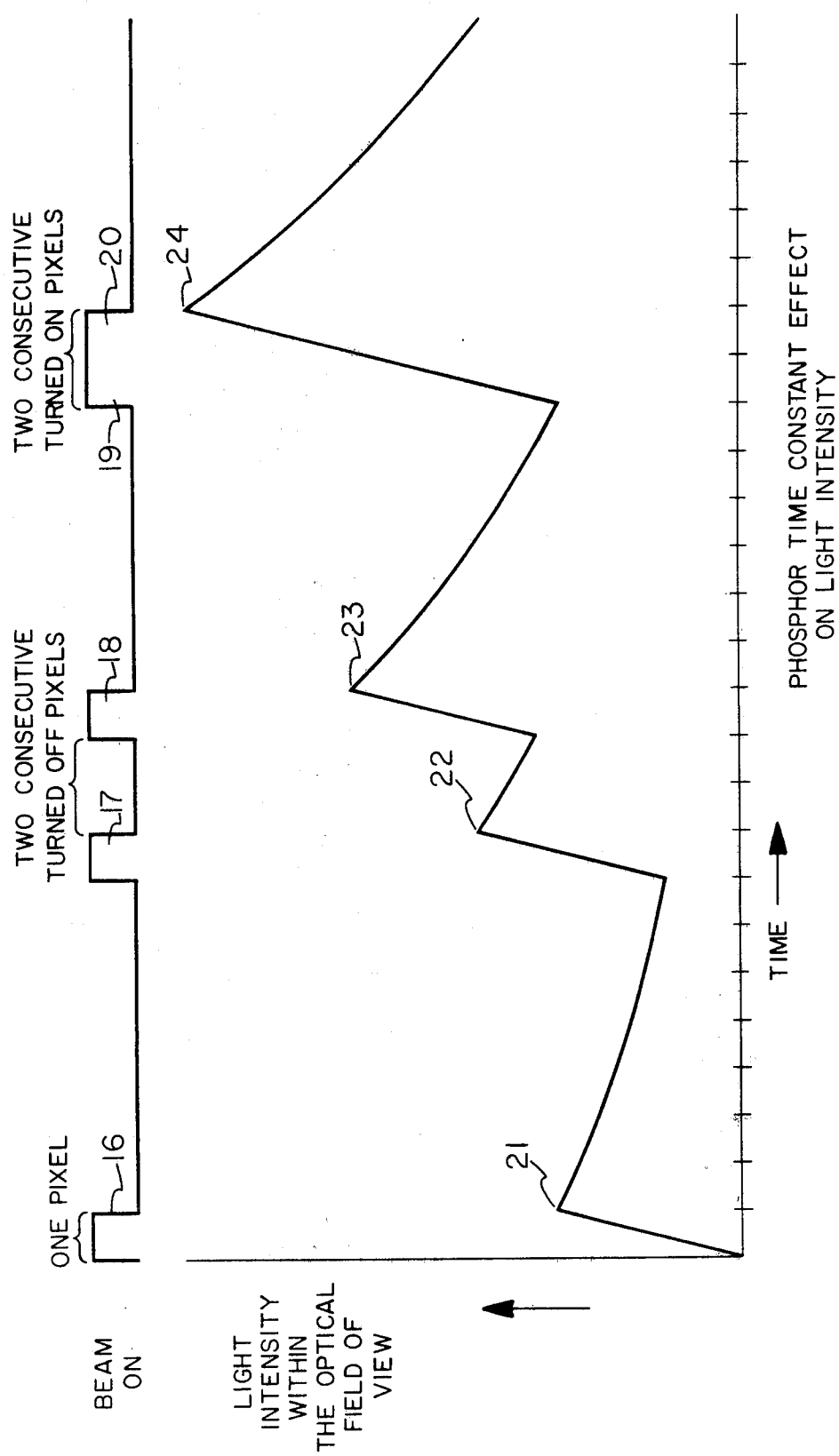
FIG. 5 illustrates how previously turned on pixels on the same scan line and also within the field of view change the threshold level necessary to detect a hit.

FIG. 5 shows the effect of the phosphor time constant upon the total light intensity within the overall optical field of view for various combinations of pixels. Within the overall optical field of view the contribution from each succeeding pixel augments the contribution remaining from the preceding pixels. Assume that the pixel corresponding to the numeral 16 is the first turned on pixel in the entire scan line, that the direction of the scan is from left to right, and that that pixel is approximately vertically centered in the field of view, but horizontally near the left-hand edge.

As the pixel corresponding to the numeral 16 is written the light intensity rises to a peak denoted by the numeral 21. Thereafter is a period of decay corresponding to seven turned off pixels, ending at the next turned on pixel, which is denoted by the numeral 17. At that time the light intensity begins again to rise, by an amount equal to the increase for the previous pixel. But since the previous rise had not fully decayed the resulting peak denoted by the numeral 22 is higher than the peak denoted by the numeral 21. Thereafter is a period of decay corresponding to two turned off pixels, ending at the next turned on pixel, which is denoted by the numeral 18. As before, the contribution is equal in magnitude to each of the two previous contributions, but the resulting peak denoted by the numeral 23 is higher still, because of the incomplete decay of the previous peak. Thereafter is a period of decay corresponding to six turned off pixels, ending with two consecutively turned on pixels denoted by the numerals 19 and 20. At that time the light intensity begins to increase by an amount equal to twice the increase for a single pixel.

Clearly, the larger the field of view, the greater the level that the overall light intensity therein can reach. If the threshold level of the signal comparator 202 is set low enough for the pixel denoted by the numeral 16 to generate a hit, then there is no reliable way to determine which of the succeeding pixels are turned on and which are turned off.

Figure 6:
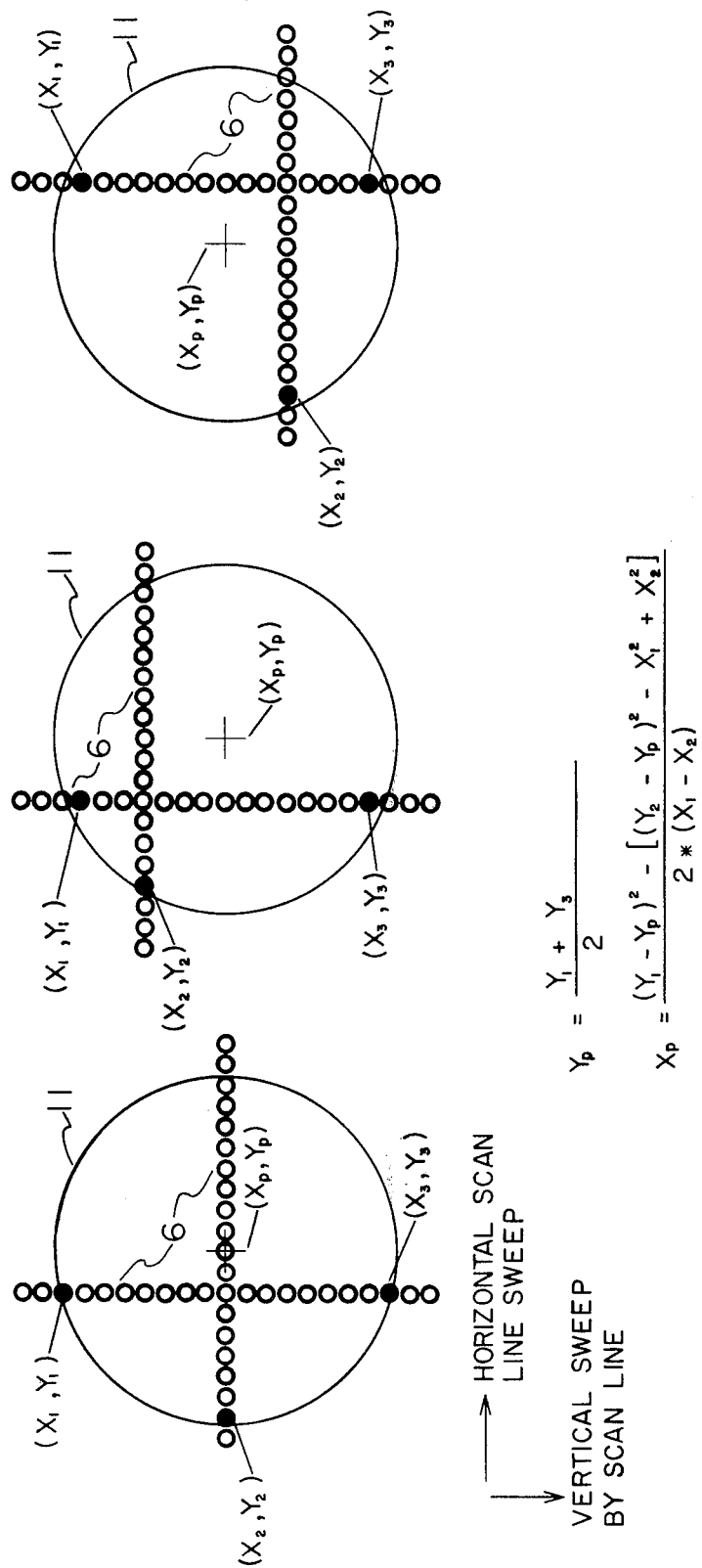
FIG. 6 illustrates the method used in the embodiment of FIG. 1 to estimate the center of the field of view from the hits obtained from the tracking cursor of FIG. 2.

Now consider the case where the only information in or near the field of view of the light pen 3 is the tracking cursor 6. Three general instances of that situation are shown in FIG. 6. If the coordinates of the three pixels at the points $(X_1, Y_1)$, $(X_2, Y_2)$ and $(X_3, Y_3)$ can be determined, it can be shown that the center of the field of view $(X_p, Y_p)$ is given by the equations:

$$Y_p = (Y_1 + Y_3)/2 \qquad (1)$$

$$X_p = \{(Y_1 - Y_p)^2 - [(Y_2 - Y_p)^2 - X_1^2 + X_2^2]\}/[2*(X_1 - X_2)] \qquad (2)$$

Equations (1) and (2) follow from the theorem that three points along the circumference of a circle uniquely determine that circle and therefore also determine its unique center. The underlying assumption is that the effective field of view is indeed circular. Or, put another way, that the effective field of view is a single dot field of view 11. That is true for the pixels at the points $(X_1, Y_1)$ and $(X_3, Y_3)$, as in both cases those pixels are each the first one to generate a hit on their respective scan lines. (Remember, the tracking cursor 6 is assumed to be the only information in or near the field of view.)

However, since the circular single dot field of view 11 is generally small enough that a substantial left-hand portion of the horizontal element of the tracking cursor 6 extends to the left of the single dot field of view 11, and because of the phenomenon explained in connection with FIG. 5, it cannot be assumed that the same threshold level for signal comparator 102 that produced hits for the pixels at points $(X_1, Y_1)$ and $(X_3, Y_3)$ will also produce a hit for the pixel at the point $(X_2, Y_2)$. To determine the coordinates of the pixel at the point $(X_2, Y_2)$ it is necessary to develop the concept of the horizontal line field of view. This is done below, and it is shown that $(X_2, Y_2)$ is obtainable.

Once $(X_p, Y_p)$ is known the tracking cursor 6 can be moved to track the position of the light pen 3. This follows from the fact that the graphics system itself already knows where the tracking cursor is, while the point $(X_p, Y_p)$ tells the graphics system where the tracking cursor 6 ought to have been. In a preferred embodiment a prediction algorithm enables the graphics system to accurately track the light pen 3, with the tracking cursor 6, at velocities upwards of one meter per second.

Figure 7:
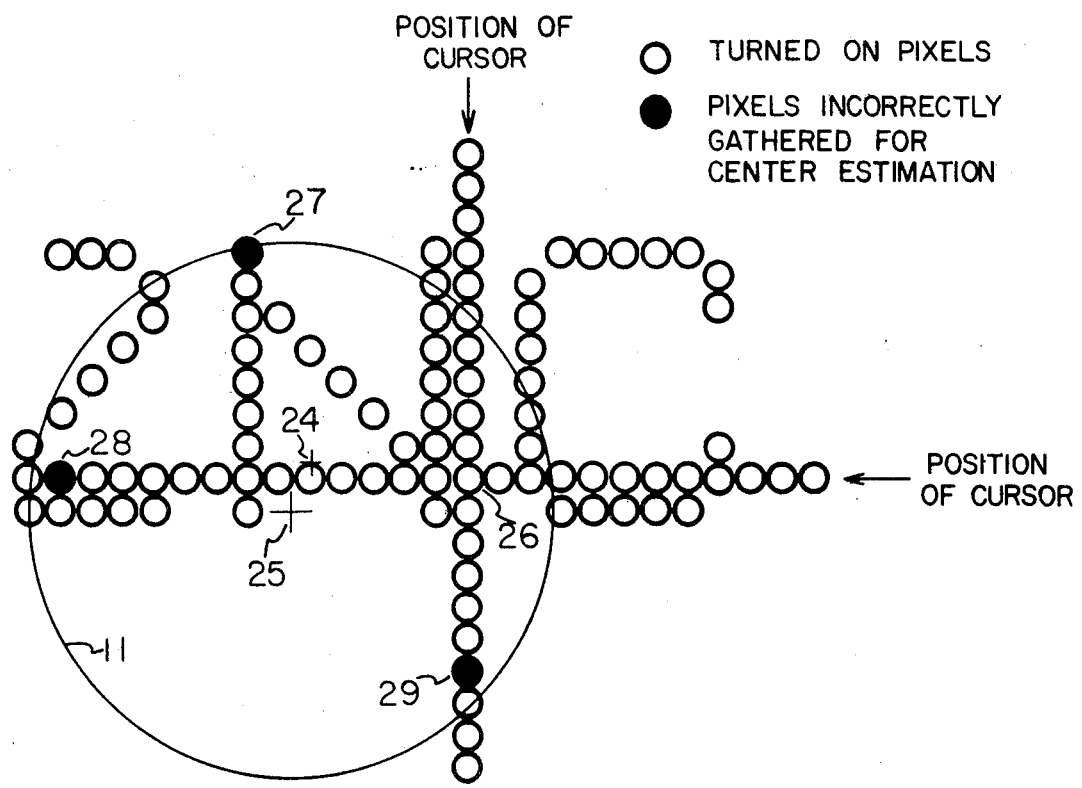
FIG. 7 illustrates how, if left unaccounted for, user data in the field of view can cause the center estimation FIG. 6 to be incorrect.

Before taking up the concept of a horizontal line field of view, consider the effect of additional information in the field of view upon the center estimation technique of FIG. 6. FIG. 7 shows how, if left unaccounted for, additional displayed information in the field of view can cause errors in the estimation for the center of the field of view. In particular, the pixels denoted by numerals 27, 28, and 29 are hits used to produce an estimated center 24. The true center 25 is not obtained since the pixel denoted by the numeral 27 is not part of the tracking cursor denoted by the numeral 26.

Figure 8A:
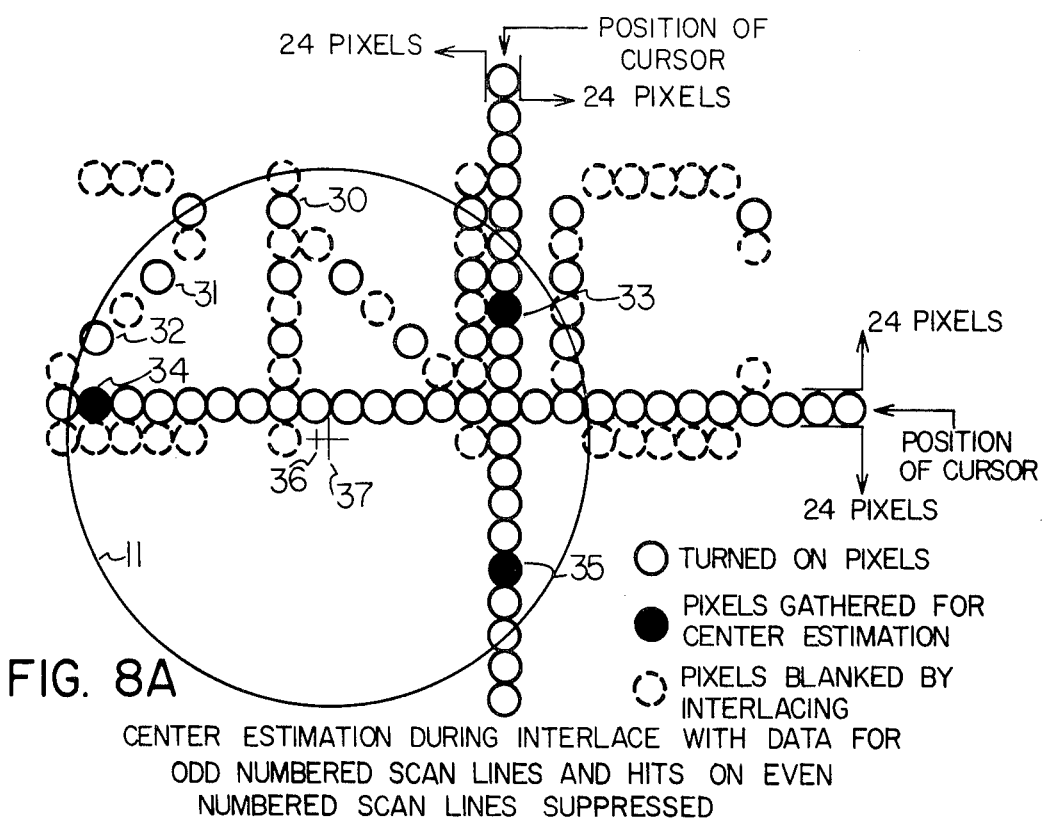
FIGS. 8A and 8B illustrate how even/odd scan line interlacing by successive frames within the region of interlacing shown in FIG. 2, when coupled with the selective suppression of hits, produces nearly correct center estimates.
Figure 8B:
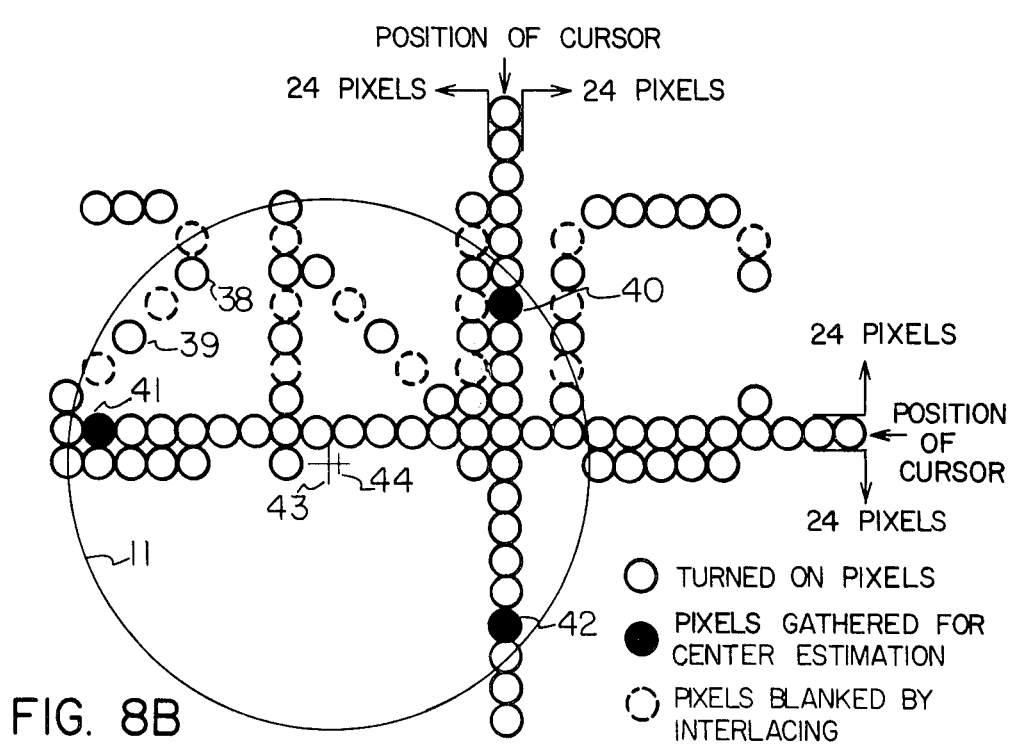

FIGS. 8A and 8B show how the incorrect center estimation problem of FIG. 7 is solved by the technique of even/odd scan line interlacing by successive frames. FIGS. 8A and 8B are each expansions of the portion of FIG. 2 enclosed by the dotted line 8. Within that region, which is preferably square, and of the same size as and centered over the tracking cursor 6, successive alternate frames of the display are respectively designated even and odd. For either an even or an odd frame the tracking cursor 6 is always displayed in full, as is the user data 7 outside the dotted line 8. During an odd frame, as depicted in FIG. 8A, the pixels for noncursor data on odd numbered scan lines are blanked, and hits on even numbered scan lines are totally ignored. During an even frame, as depicted in FIG. 8B, the pixels for noncursor data on even numbered scan lines are blanked, and hits on odd numbered scan lines are totally ignored.

Thus, during an odd frame the only hits that occur on odd numbered scan lines are those caused by the tracking cursor 6 itself. In the example shown in FIG. 8A such hits are the pixels represented by the numerals 33, 34, and 35. These hits produce an estimated center 36 that is very close to the true center 37. Hits on even numbered scan lines, such as those denoted by the numerals 30, 31, and 32, may potentially represent either user data 7 or the tracking cursor 6; there is no practical foolproof way to tell which, so those hits are ignored.

FIG. 8B shows the corresponding situation during an even frame, when noncursor data on even numbered scan lines are blanked. The only hits occurring on even numbered scan lines are those caused by the tracking cursor 6 itself. The pixels represented by the numerals 40, 41 and 42 are such hits. Those hits produce an estimated center 44 that is very close to the true center 43. Hits denoted by the numerals 38 and 39 are ignored, since they occur on odd numbered scan lines.

A new center estimate is performed once each frame, whether for even or odd interlacing within the interlaced region 8 surrounding the tracking cursor 6. Center estimates for even frame interlacing are not necessarily equal to those obtained from odd frame interlacing, but their difference is small enough to ignore.

The interlacing technique described above allows the graphics system to distinguish the user's data 7 from the tracking cursor 6 so that proper Y-values for $(X_1, Y_1)$ and $(X_3, Y_3)$ may be obtained. Their X-values always lie on the vertical member of the tracking cursor 6, and are therefore already known. Similarly, the Y-value of $(X_2, Y_2)$ is always on the horizontal member of the tracking cursor 6, and is therefore already known. How to find the X-value of $(X_2, Y_2)$ is described below. Note that since the forty-nine pixel size of the region of interlacing 8 is greater than the size of the single dot field of view, the hits for $Y_1$, $X_2$, and $Y_3$ are always the first hits on their respective scan lines. Finally, note that while the interlacing technique entails that the user's data 7 within the dotted line region 8 of FIG. 2 will appear to have a somewhat lesser intensity than that of noninterlaced data, all features of the interlaced data are displayed as of every second frame. Thus it is possible to accurately position the tracking cursor 6 over any desired pixel of the data.

For the tracking cursor 6 to accurately track the light pen 3 the diameter of the single dot field of view 11 must remain less than or equal to the forty-nine pixel length and width of the tracking cursor 6 and also less than or equal to the size of the region of interlacing 8. Furthermore, the diameter of the single dot field of view 11 initially increases as the distance from the light pen 3 to the faceplate of the CRT increases from zero to some distance D, beyond which the diameter again decreases due to diminishing light intensity and the resulting difficulty in exceeding the threshold. Since the diameter of the single dot field of view increases to only about thirty pixels even at a distance of one inch from the faceplate, the diameter condition mentioned above is easily met.

Figure 9:
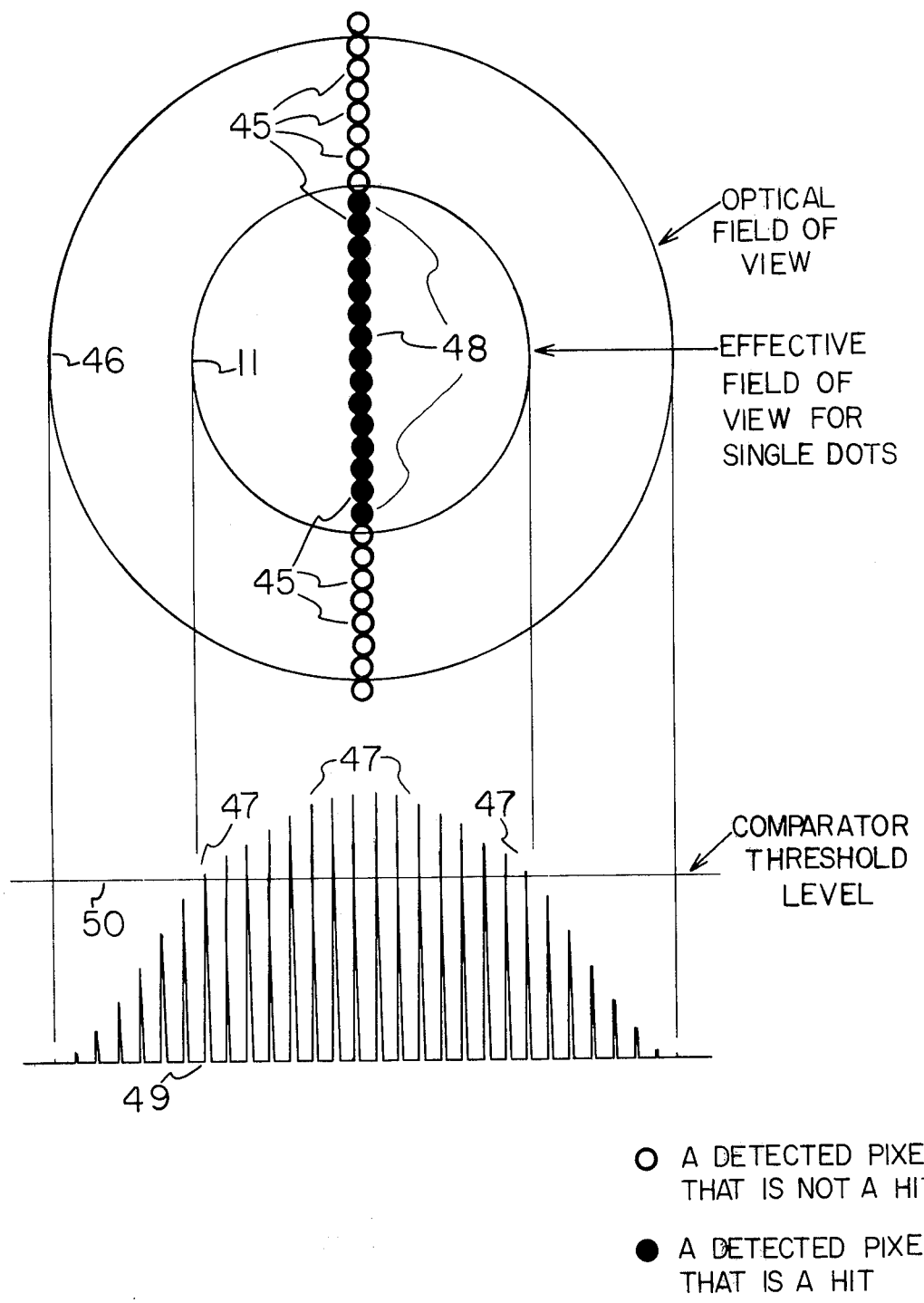
FIG. 9 is a more detailed illustration of the concept of single dot field of view of FIG. 3.

FIG. 9 begins a more detailed examination of the notion of field of view. In FIG. 9 the circle denoted by the numeral 46 defines a region in front of the light pen 3 within which a pixel of some arbitrary standard intensity can be detected by the photo detector 100 and its lens assembly 114. Call that region the optical field of view. Consider a vertical line of pixels 45 displayed in the middle of the optical field of view 46. The signal generated by the photo detector 100 will be similar to that denoted by the numeral 49, where the peaks on the left correspond to the pixels at the top of the optical field of view 46, and so on, and the time between peaks equals the duration of one scan line in the raster. The envelope of these peaks is the attenuation pattern shown in FIG. 3. Let the waveform 49 be applied to a signal comparator, such as denoted by the numeral 102 in FIG. 12.

For a comparator threshold such as that represented by the line 50 only those peaks 47 exceeding the thresold will produce outputs. The pixels corresponding to those outputs, denoted by the numeral 48, have been called hits, and lie within a circular region 11 called the single dot field of view. Any solitary pixel anywhere within the single dot field of view will produce an output from the signal comparator 102 and will generate a hit. Conversely, single pixels outside the single dot field of view will not generate a hit.

Figure 10:
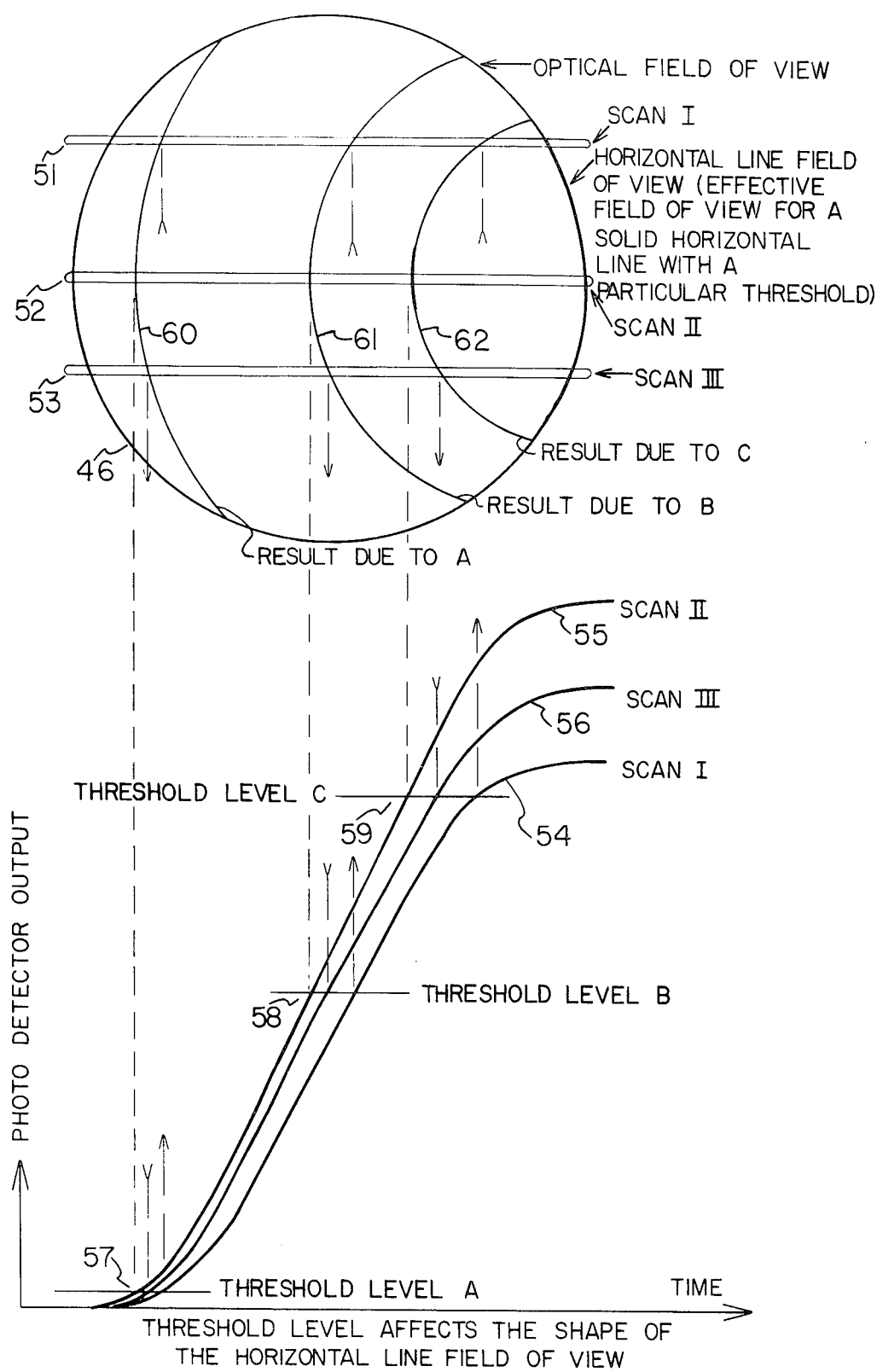
FIG. 10 illustrates the concept of horizontal line field of view for the light pen of FIG. 1, and shows the manner in which its size and location are partly a function of the light intensity required to exceed an electrical threshold to produce a hit.

In contrast, consider a horizontal line through the optical field of view 46, three cases of which are shown in FIG. 10. Recall the cumulative effect upon light intensity for pixels upon the same scan line, illustrated in FIG. 5. Consider scan line I, denoted by the numeral 51. It produces an output from the photo detector 100 (referring to FIG. 12) similar to that denoted by the numeral 54. In a like manner scan line II 52 and scan line III 53 produce outputs similar to those denoted by numerals 55 and 56, respectively.

If the threshold level of the signal comparator 102 remained at the same level as that used for generating the signal dot field of view for FIG. 9, it would be at a relative value in FIG. 10 such as indicated by the line 57. Call that threshold level A. Corresponding to this would be a change in the shape of the field of view; the left-hand edge of the field of view would be similar in shape to that of the line 60.

Consider the case when the threshold is at level B, as denoted by the line 58. This results in a further reduction in the field of view, with the left-hand edge now being the line 61. It can be shown that boundaries such as those denoted by numerals 60 and 61 tend to be circular.

Whereas a single dot field of view is a circular *region* of some radius about a center, the notion of a horizontal line field of view is best thought of as a boundary to be approached from a given direction by a succession of turned on pixels on the same horizontal line. A single dot field of view guarantees a hit for any solitary pixel anywhere *within* its region, but the conditions surrounding a horizontal line indicate one and only one hit, occurring when one of the series of advancing pixels *reaches the boundary.*

Consider now threshold level C, denoted by the numeral 59. It is chosen to produce a horizontal line field of view whose boundary 62 has approximately the same radius of curvature as the single dot field of view 11. Now, the radius of curvature for the horizontal line field of view is partly a function of display intensity and the distance from the light pen 3 to the faceplate of the CRT, just as is the radius of the single dot field of view. Once threshold level C is set so that the radius of the horizontal line field of view 62 approximates the radius of the single dot field of view 11, when the light pen 3 is at a given distance from the CRT, the two radii tend to vary together and remain equal as display intensity or that distance changes.

Figure 11:
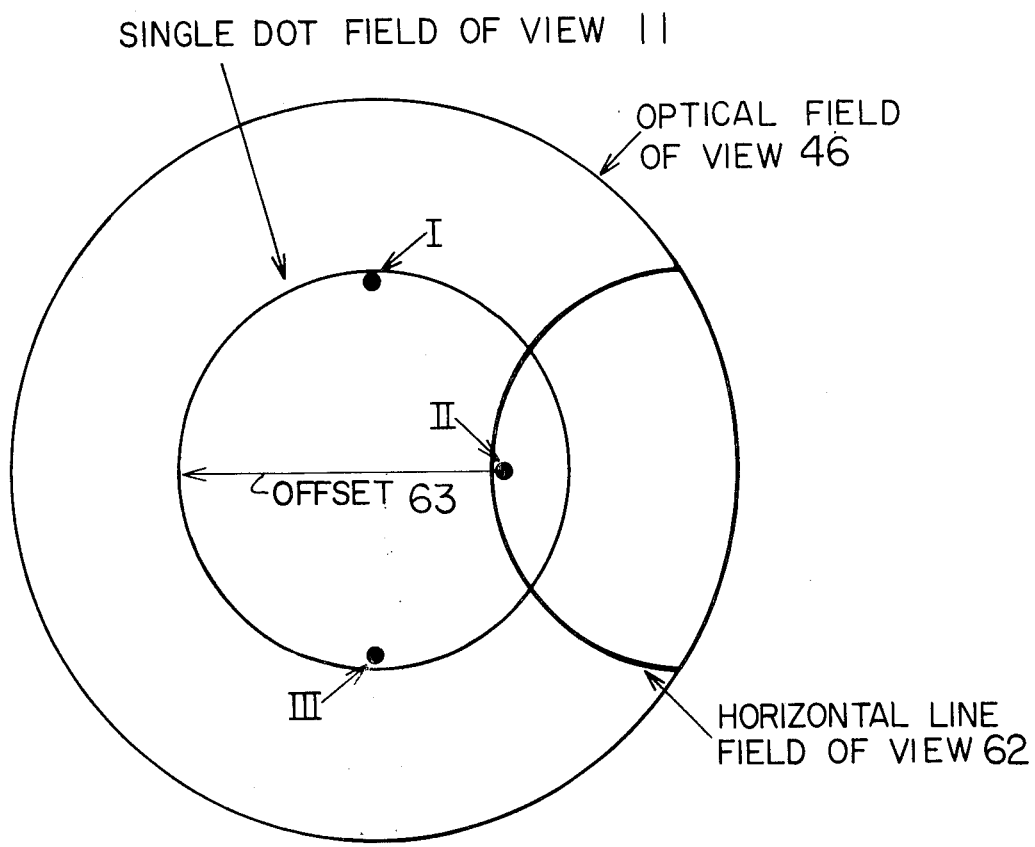
FIG. 11 illustrates the preferred relative size and position of the single dot and horizontal line fields of view for the embodiment of FIG. 1.

FIG. 11 shows the relative spatial positions of the single dot field of view 11 and its corresponding horizontal line field of view 62. Even though their radii of curvature are approximately the same and they are both vertically centered in the optical field of view 46, the horizontal line field of view 62 is horizontally offset to the right by the length of the line denoted by the numeral 63. Note that since the radii of the two types of field of view remain equal, the value of the offset remains constant and is *not* a function of the distance from the light pen 3 to the faceplate of the CRT, nor of the level of display intensity.

Referring again to FIG. 5 and FIG. 6, recall that $(X_2, Y_2)$ could not be obtained from the single dot field of view 11. When measuring $X_2$ the CRT display unit 1 invokes the horizontal line field of view by temporarily raising the threshold from level A to level C.

Referring now to both FIG. 6 and FIG. 11, the point labelled I in FIG. 11 corresponds to the point $(X_1, Y_1)$ of FIG. 6. Similarly, point III corresponds to $(X_3, Y_3)$. The Y-value of point II equals $Y_2$, but the X-values differ by the amount of the offset. That is:

actual $X_2$ = measured $X_2$ − offset  (3)

The graphics firmware system knows the value of the offset and solves equation (3) to find the actual value of $X_2$ before proceeding with the center estimation activity of FIG. 6. For the preferred embodiment discussed herein the value of the offset is eleven pixels. Because the curvature of the horizontal line field of view 62 approximates that of the single dot field of view 11 the offset correction is equivalent to shifting the horizontal line field of view 62 to the left until it coincides with the single dot field of view 11. Thus, the assumptions about the field of view concerning the applicability of the center estimation equations (1) and (2) remain valid.

An additional advantage obtained by raising the threshold from level A to level C is an increased signal-to-noise ratio for the measurement of $X_2$.

FIG. 12 is a block diagram of a graphics system including a CRT display unit 1 and a light pen 3 and incorporating a tracking region of interlacing and threshold level shifting. Prior to the time when the tracking cursor 6 is to be displayed the interrupt service routine sends adjusted cursor address information to each of an X cursor address minus twenty-four register 82 and a Y cursor address minus twenty-four register 80. The values of the address sent have units of pixels, and the values have already been decremented by twenty-four from the actual center of the tracking cursor 6. That is, the registers 82 and 80 receive an address that describes the upper left-hand corner of the region of interlacing 8.

A sync generator circuit 66 generates a pixel clock signal and horizontal and vertical retrace signals used in driving sweep circuits 77, a display memory 78, an X pixel counter 79, and a Y scan line counter 67. Each cycle of the horizontal retrace signal increments the count in the Y scan line counter 67. When the count in the Y scan line counter 67 reaches the value stored in the Y cursor address minus twenty-four register 80 a Y comparator 81 enables a forty-nine scan line counter 64. The forty-nine scan line counter 64 counts cycles of the horizontal retrace signal to determine the upper and lower vertical boundaries of the tracking cursor 6, which are also the vertical boundaries for the region of interlacing 8. It also identifies the scan line during which the horizontal element of the tracking cursor 6 is to be displayed by generating a signal labelled Y CURSOR.

Similarly, the X pixel counter 79 counts cycles of the pixel clock signal and cooperates with an X cursor address minus twenty-four register 82 and X comparator 83 to enable a forty-nine pixel counter 65 to define the left-hand and right-hand edges of the tracking cursor 6 and the region of interlacing 8. During each scan the forty-nine pixel counter 65 also identifies with a signal X CURSOR the pixel representing the vertical element of the tracking cursor 6.

The signal X CURSOR is true whenever the count in the forty-nine pixel counter 65 equals twenty-five. Similarly, the signal Y CURSOR is true whenever the count in forty-nine scan line counter 64 equals twenty-five. Whenever either one of those two signals is true a pixel is being written that belongs to the tracking cursor 6.

A signal X BLANKING from the forty-nine pixel counter 65 indicates that the count x therein is within the range $1 \leq x \leq 49$. Similarly, a signal Y BLANKING from the forty-nine scan line counter 64 indicates that the count y therein is within the range $1 \leq y \leq 49$. The signals X BLANKING and Y BLANKING are combined with a signal 113 by AND gate 84 to produce a signal 69 that is true whenever interlacing is desired and the beam of the CRT is within the region of interlacing 8. The signal 113 represents a surplus high order address bit from the X cursor address minus twenty-four register. The value of signal 113 is controlled by the interrupt service routine, according to whether or not the region 8 around the cursor is to be interlaced. When the tracking cursor 6 is visible on the screen, but not tracking, the region 8 will not be interlaced. (If the computed center of the field of view gets "close to" the known coordinates of the stationary tracking cursor 6, the interrupt service routine turns the interlacing back on.)

An even/odd frame latch 68 is toggled by the vertical retrace signal ater each frame, and its output is combined with the lowest order bit $\phi$ of the Y scan line count by an exclusive OR gate 85 to produce a signal 86 identifying which scan lines are to be blanked for a given frame. Signal 86 is combined with signal 69 by an AND gate 87 to produce a signal 70 indicating when blanking is to be invoked by a video mixer 72 to create the interlacing, as well as indicating when a hit is to be allowed to latch the Y1 register 88 and Y3 register 89.

The signals X CURSOR and Y BLANKING are combined by an AND gate 90 to produce a signal 91 indicating when to write the pixels in the vertical element in the tracking cursor 6. Similarly, an AND gate 92 combines the signals Y CURSOR and X BLANKING to produce a signal 93 indicating when to write the pixels in the horizontal element of the tracking cursor 6. Signals 91 and 93 are combined by an OR gate 94 to produce a signal labelled CURSOR VIDEO that is true whenever any pixel that is part of the tracking cursor 6 is to be written. The video mixer 72 combines the signal CURSOR VIDEO with signal 71 from the display memory 78 to produce a final video signal 73 that incorporates both the region of interlacing 8 and the tracking cursor 6.

The video information is subsequently displayed on the CRT. The portion of the displayed information that is within the optical field of view is directed by lens assembly 114 to the photo detector 100, whose output is amplified by bandpass amplifier 101. The bandpass amplifier 101 removes low frequency environmentally caused noise, such as that caused by fluorescent lamps, sunlight, etc. The amplified output signal 76 is fed to a signal comparator 102 which compares output signal 76 against a reference voltage 75. The value of the reference voltage 75 is determined by amplifier circuit 74 in response to the value of the signal Y CURSOR. The signal Y CURSOR is true only during the generation of the particular scan line containing the horizontal element of the tracking cursor 6. When Y CURSOR is false the threshold for the signal comparator 102 is at level A, but moves to level C for as long as Y CURSOR is true.

The output signal 77 of the signal comparator 102 is fed to a detect latch 95, which produces an output signal labelled HIT. The signal HIT is used to variously latch the value of the Y scan counter 67 into the $Y_1$ register 88 and $Y_3$ register 89, and latch the value of the X pixel counter 79 into the $X_2$ register 96, according to which of the following conditions occur:

(i) If the hit is the first hit of the frame, then latch each of the three registers 88, 89 and 96.

(ii) If the hit is the first hit of the frame to occur within the blanked portion of a scan line blanked by interlacing, then latch the $Y_1$ register 88.

(iii) If the hit is on the same scan line as the horizontal element of the tracking cursor, then latch the $X_2$ register 96.

(iv) If the hit is within the blanked portion of any scan line blanked by interlacing, then latch the $Y_3$ register 89.

Condition (i) is used to allow the light pen 3 to perform non-cursor coarse picking of such things as menu selections, and is implemented as follows. The signal VERTICAL RETRACE resets both latches 97 and 98. That causes the signal 108 from latch 97 to become true, whereupon it passes through OR gates 99 and 104 to be present at one input of each of AND gates 105 and 107. Once that happens the $Y_1$ register 88 and $X_2$ register 96 will latch their respective values as soon as HIT goes true. The signal 109 will also become true when VERTICAL RETRACE resets the latch 98. Signal 109 passes through OR gate 103 to be present at one input of AND gate 106. Once that happens the $Y_3$ register 89 will latch its value as soon as HIT goes true.

Conditions (ii), (iii) and (iv) are used for accurate picking of information by the light pen 3 during tracking mode operation.

Condition (ii) is implemented as follows. Once reset by the signal VERTICAL RETRACE the latch 98 can be set only by a hit that occurs while a blanked portion of a scan line is being written. This is because AND gate 112 sets latch 98 only when HIT occurs during BLANK BACKGROUND. Therefore, latch 98 stays reset until a hit of the type that is of interest to condition (ii) occurs. While latch 98 is reset the signal 109 is true. The signal BLANK BACKGROUND 70 will also be true while the CRT beam is with the region where condition (ii) might be met. BLANK BACKGROUND and the true signal 109 from latch 98 are combined by the AND gate 110 to produce a true output signal 111 which is fed through OR gate 99 to one input of the AND gate 105. If HIT occurs while the output from OR gate 99 is true the $Y_1$ register 88 latches the current value of the Y scan counter 67, which provides the value of $Y_1$. Such an occurrence of HIt sets the latch 98 as explained above. Once latch 98 is set no further values will be latched into the $Y_1$ register 88.

Condition (iii) is implemented as follows. Each time the scan line containing the horizontal element of the cursor occurs the threshold of the signal comparator 102 is temporarily shifted from level A to level C, as previously explained. The same signal that causes the shift (i.e., Y CURSOR) is also supplied as an input to OR gate 104. Thus, whenever the threshold level shift is in effect the output of OR gate 104 is true. That true output is combined with HIT by AND gate 107 to cause the $X_2$ register 96 to latch the current value of the X pixel counter 79, providing the measured value of $X_2$. After that Y CURSOR will be false for all successive scan lines, preventing the latching of any further values into the $X_2$ register 96.

Condition (iv) is implemented as follows. Whenever the beam of the CRT is within that region of a scan line blanked by interlacing the signal BLANK BACKGROUND 70 is true. That causes a true output from OR gate 103. If the signal HIT occurs while the output from OR gate 103 is true the $Y_3$ register 89 will latch the current value of the Y scan counter 67, which provides a value for $Y_3$. Condition (iv) generally occurs several times as successive hits along the vertical element of the tracking cursor 6 are detected. The last such value latched into the $Y_3$ register 89 is the desired value.

After conditions (i) through (iv) have been satisfied, or at least at the end of the frame, an interrupt controller 115 generates an interrupt request. If each of conditions (i) through (iv) have been satisfied before the frame is half finished the interrupt request will occur at a point half-way through the frame. In all other cases it occurs at the end of the frame. Upon the granting of the interrupt the interrupt service routine reads the collected data from the registers 88, 89, and 96. That data includes three additional bits of status information encoded into the three most significant bits of the $Y_1$ register 88. These are the status of the pushbutton 5, signal 108 (designating whether or not there has been at least one hit during the frame) and the signal BLANK BACKGROUND. If true when the $Y_1$ register 88 is latched, BLANK BACKGROUND indicates that the value of $Y_1$ (and by implication the values of $X_2$ and $Y_3$ also) was obtained from within the region of interlacing 8. That is, those values represent the tracking cursor. If the latched value of BLANK BACKGROUND is false the graphics firmware system assumes that a nontracking mode pick is occurring. The collected data also includes information about the value recorded in the $X_2$ register 96. An upper bit of that register latches the value of Y CURSOR at the same time the value of the count from the X pixel counter 79 is latched into the lower bits. This provides a later indication to the graphics firmware system of whether or not the measured value for $X_2$ corresponds to the tracking cursor 6.

Figure 13:
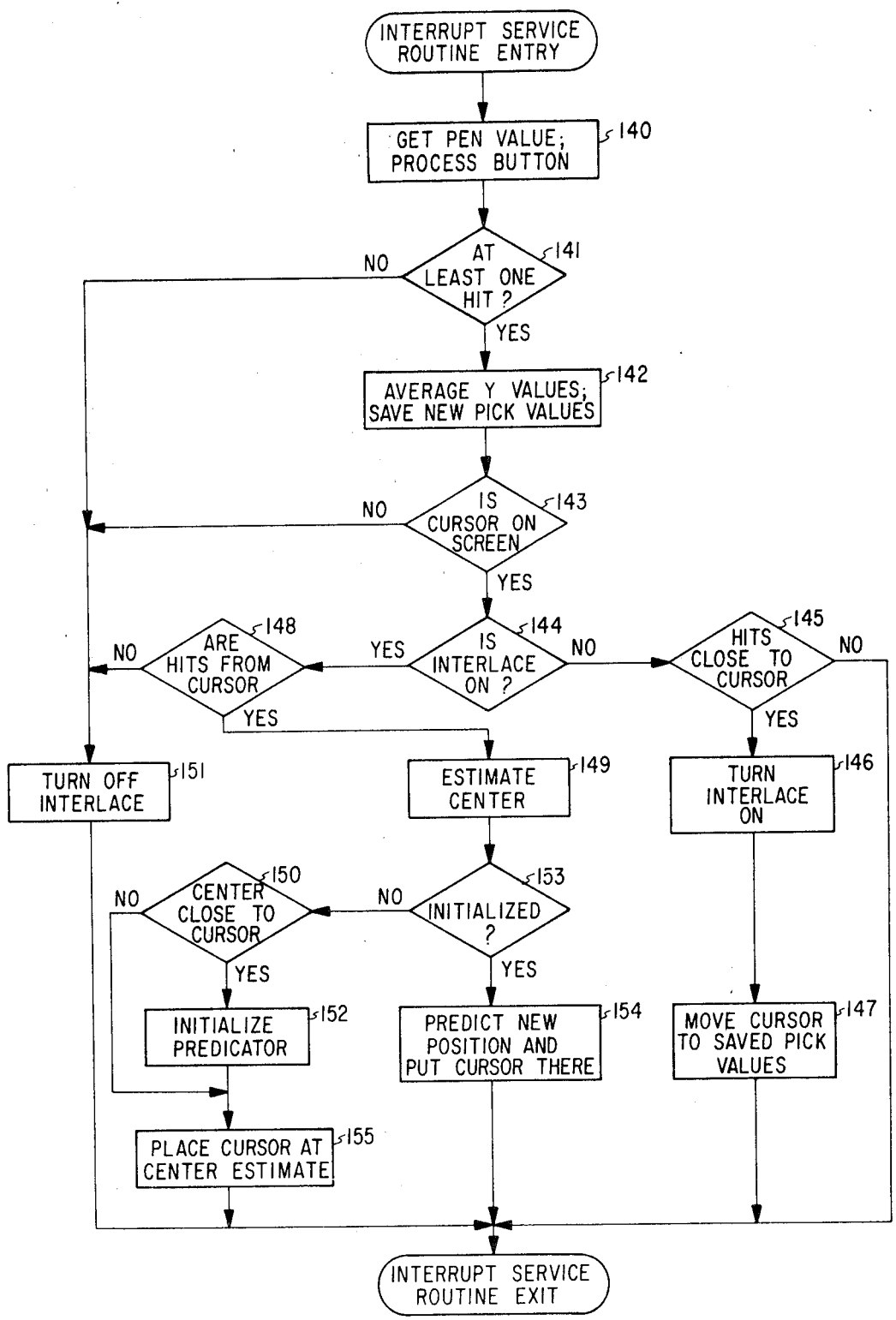
FIG. 13 is a simplified flowchart of an interrupt service routine executed by the computer of FIG. 1 in response to activity of the CRT display unit and light pen of FIG. 1.

FIG. 13 is a simplified flowchart of an interrupt service routine for cooperation with the CRT display unit 1. Upon entry the step denoted by numeral 140 reads the values of the various registers 88, 89 and 96 of FIG. 12 and also sets a flag communicating with the user's program to reflect the status of the pushbutton 5.

Following that, a qualifier denoted by numeral 141 is asked to determine if there has been any hit at all during the frame. Beginning with the qualifier 141 a number of possible circumstances surrounding the operation of the light pen 3 are tested for, and if found, acted upon. A number of these possibilities culminate at the step denoted by the numeral 151. That step turns off interlacing by adjusting the value of a status bit in the X cursor address minus twenty-four register 82. That status bit controls the value of signal 113. As explained in connection with FIG. 12, when the value of signal 113 is false, the CRT display unit 1 does not form an interlaced region 8 around the tracking cursor 6. The interrupt service routine is exited following step 151.

The first case that the flowchart responds to is when the light pen 3 generates no hits at all during the frame. In such a case the answer to qualifier 141 is "no", whereupon step 151 turns interlacing off and the interrupt service routine is exited. The answer to qualifier 141 is found by inspection of the upper bits read from the $Y_1$ register 88 and $X_2$ register 96; the encoding of those bits was explained in connection with FIG. 12. A variety of conditions can cause the answer to qualifier 141 to be "no", among them being total removal of the light pen 3 from the screen of the CRT, or abruptly moving the light pen 3 to an unilluminated area of the CRT screen. Either way, regardless of whether the tracking mode was in effect or not, the effect is to force the nontracking mode by turning off interlacing. If the tracking cursor 6 is on the screen, it simply remains at its previous location.

The second case that the flowchart responds to is when there is at least one hit generated by the light pen 3, but the tracking cursor 6 is not on the CRT screen. In this case a nontracking mode pick is possibly being performed; if so, the pushbutton can cause the user's program to take appropriate action. To prepare for such a pick step 142 averages the Y values of registers 88 and 89 and saves the averaged Y result along with the measured X value from register 96. Qualifier 143 determines by inspection of the values last selected for the address of the tracking cursor 6 whether or not the address is on or off the screen. Assuming it is not, step 151 is next, whereupon the interrupt service routine is exited.

The third case that the flowchart responds to is when there is at least one hit and the tracking cursor 6 is displayed upon the screen, but the tracking mode is not currently established nor do the saved pick values represent a point both of whose X and Y coordinates are "close" (i.e., within fifteen pixels) of the location of the tracking cursor 6. A "no" answer to qualifier 144 means that the tracking mode of operation is not in effect. Qualifier 145 checks the closeness requirement, and upon a "no" answer terminates the interrupt service routine.

A fourth case occurs when the conditions for case three are met except that the answer to qualifier 145 is "yes". This case corresponds to the user positioning the light pen 3 in the vicinity of the tracking cursor 6 to institute tracking mode operation. When qualifier 145 is reached and its answer is "yes" step 146 turns interlacing on and step 147 moves the tracking cursor 6 to the address determined by the nontracking mode pick. This amounts to an approximation only, since nontracking mode picks are not particularly accurate in the X direction. Following step 147 the interrupt service routine is exited.

A fifth case occurs when there is at least one hit, the tracking cursor 6 is on the screen, the tracking mode is desired (i.e., interlace is on), the hits for the frame are from the tracking cursor 6, but the prediction algorithm has not yet been initialized although the estimated center of the field of view is "close" (i.e., within four pixels in both X and Y of the location of the tracking cursor 6). In this case the answer upon reaching qualifier 144 is "yes", and qualifier 148 is asked next. Qualifier 148 asks if the hits recorded during the course of the frame are from the tracking cursor 6. This can be determined by inspection of the upper hits of the $Y_1$ register 88 and $X_2$ register 96, as explained in connection with FIG. 12. Following the "yes" answer to qualifier 148 step 149 estimates the coordinates for the center of the field of view, as explained in connection with FIGS. 6, 7, and 8. Following that, qualifier 153 asks if the prediction algorithm has been initialized (i.e., is it currently in use?). Assuming the answer to be "no", qualifier 150 asks if the estimated center of the field of view is within four pixels, for each of X and Y, of the location of the tracking cursor 6. Assuming that it is, the answer is "yes" and step 152 initializes the prediction algorithm and step 155 places the cursor at the center estimate found at step 149. At that time the interrupt service routine is concluded.

A case six arises if the answer to qualifier 150 is "no". In this case bad luck has the estimate for the center of the field of view too far from the actual location of the tracking cursor 6 to safely engage the prediction mechanism. In such a case the tracking cursor 6 is moved by step 155 to only the center estimate of step 149. Assuming the user continues to approach the tracking cursor 6 with the light pen 3, successive instances of case six will be only temporary and a successful case five will eventually occur.

Case seven is the actual tracking and prediction of the location of the tracking cursor 6. This case occurs when the answer upon reaching and asking qualifier 153 is "yes". Thereupon step 154 predicts a new position for the tracking cursor 6, and implements same, whereupon the activity of the interrupt service routine is complete. Once case seven has been achieved it is succeeded by subsequent case seven's until the tracking mode is aborted, as explained below.

In each instance of cases five, six and seven the answers to various qualifiers must remain as follows, or the tracking mode is aborted, and can be reentered only through a sequence of those cases described to this point: The answer to qualifiers 141, 143, 144 and 148 must be "yes". If any wrong answers occur the conditions for successful tracking do not exist and the tracking mode is terminated by turning off interlacing. Call that case eight. Case eight requires that the light pen 3 reacquire the tracking cursor 6 before the tracking mode is reestablished.

FIG. 14 illustrates the sequence of cases that occur in the establishment of the tracking mode. FIG. 14 is not a flowchart in the same sense that FIG. 13 is. FIG. 14 represents a sequence of possible successive instances of activity in the interrupt service routine of FIG. 13.

The first portion of FIG. 14 is an initial tracking state, corresponding to cases one, two and three. In the initial tracking state the graphics firmware system "idles" while waiting for the onset of conditions suitable for tracking.

The second portion of FIG. 14 is a first interlace state corresponding to case four. It is at this point that the tracking cursor 6 begins to follow the light pen 3.

The third portion of FIG. 14 is a center estimation state corresponding to cases five and six. The center estimation state remains in effect until the center estimate is close enough to safely begin prediction.

A successful center estimation results in arrival at a fourth portion of FIG. 14, the prediction state. In this state the location of the tracking cursor 6 is predicted for each frame.

Any case eight requires the entire tracking acquisition algorithm to begin over again.

FIG. 15 is a flowchart of the activity corresponding to step 154 of FIG. 13. This prediction algorithm allows the tracking cursor 6 to follow the light pen 3 at velocities up to forty pixels per frame.

As shown in FIG. 15, the error between the current position of the light pen 3 and the current position of the tracking cursor 6, the velocity and acceleration of the center of the field of view for the light pen 3 are each calculated. The coefficients K1, K2 and K3 are calculated and the equation for the new position of the tracking cursor 6 is executed. In order to allow smooth motion the acceleration of the tracking cursor 6 is limited, depending upon past velocity and acceleration. If the acceleration required to put the tracking cursor 6 at its new position is greater than the limit then its new position is adjusted so as to not exceed the limit.

To reduce jitter in the tracking cursor 6, the incremental change to the X and Y cursor coordinates are each reduced in value by one pixel from what those incremental changes were actually predicted to be. Thus, when the light pen 3 is moving very slowly and the actual predicted location of the tracking cursor 6 is still within one pixel (i.e., one dot) of the old location, in either of the X or Y directions, the tracking cursor 6 is not moved in that direction. The new address of the tracking cursor 6 is written to the CRT display unit 1, completing the cycle for the frame. The interrupt service routine then updates the variables for the next pass through the algorithm and then returns to its host firmware system in the computer 2.

It should be noted that when tracking a moving light pen the prediction algorithm can be in error. In the present embodiment the error can be as great as ten pixels when the light pen experiences sudden changes in direction or velocity. The degree by which the cursor is larger in size than the field of view must be equal to or greater in value than the possible error in the prediction algorithm. Otherwise, such normally occurring error can result in loss of tracking.

It will be understood by those skilled in the art that in an alternate embodiment for a raster scan graphics system the tracking cursor 6 could be displayed by itself on alternate frames while the user data 7 (and possibly the tracking cursor 6 also) is displayed during the intervening frames. Such a scheme of interleaved frames would operate without an unacceptable level of flicker provided the writing rate of the CRT, taken in conjunction with the size of the area to be written, allows a refresh rate that is sufficiently high.

In such an alternate embodiment the center estimation for the tracking cursor 6 would be performed directly as indicated by FIG. 6, and the difficulties illustrated by FIG. 7 would not be present. In such an alternate embodiment the region of interlacing 8 shown in FIG. 2 would not be as shown therein, but would instead correspond in size to the entire raster. Furthermore, in such an alternate embodiment the size of the field of view would still be smaller than the cursor, and the concept of horizontal line field of view, with its attendant threshold level shifting, would still apply.

It should be noted that in any embodiment incorporating a color CRT the following conditions obtain. First, the color of the light reaching the photosensitive element in the light pen affects its response, and therefore, affects the size of the field of view. The interlacing technique prevents color variations in the user's data from producing undesirable results. Color variations in the tracking cursor 6 are of no concern provided again that the cursor is larger in size than the field of view, and provided that the cursor is all the same color. In the present embodiment the cursor is displayed as white, and at an intensity level somewhat higher than the user's data.

FIG. 16 is a pictorial representation of the optical system of the light pen 3. The numeral 160 denotes the surface of the CRT display unit 1 upon which the image is formed and from which the light pen 3 can receive light. A housing 161 having a circular opening at one end has mounted within it a plano-convex lens 114. The plano side faces outwards, toward the direction in which the light pen is aimed. A line 166 normal to and passing through the center of the plano side of lens 114 defines the optical axis of the light pen 3. A PIN photodiode detector 100 having an integral lens is mounted within the housing 161 opposite the convex side of lens 114 and in line with the optical axis 166. The output of the detector 100 is fed to the bandpass amplifier 101, as previously described.

In a preferred embodiment the light pen 3 has properties generally different from optimal properties of light pens used in previous systems. The optical system for the light pen 3 is preferably focused at infinity, as opposed to being pre-focused or focusable upon an image displayed upon the surface 160. For optimum operation with the raster scan embodiments previously described the optical attenuation curve 163 should preferably be generally similar in shape to a raised cosine (i.e., similar to $(\cos \omega r) + 1$, for $-\pi \leq \omega r \leq \pi$). Optical attenuation curve 163 corresponds to the family of curves 9 and 120 of FIG. 3. A preferred way to produce such raised sinusoidal curves as 9, 120 and 163 is to focus the light pen at infinity and provide a viewing region for the light pen 3 having divergent boundaries 162 that are of increasing distance apart for increasing distances along the optical axis 166 from lens 114 to surface 160. That is, the boundary of the viewing region has the shape of a section of a right cone.

The resulting raised cosine optical attenuation curve 163 is in marked contrast to the general optimum shape of optical attenuation curves for prior light pens, as denoted by the numeral 165. Such an optimum shape 165 has steepest sides obtainable, with a resulting effective viewing region 164 that is cylindrical. That has generally been achieved through a combination of focusing the light pen on the screen at distances other than infinity and the use of optical stops.

Recall that in connection with FIG. 10 it was asserted that the diameters of the single dot and horizontal line fields of view were equal and varied together as a function of display intensity and distance from the CRT. The equality relation between the diameters is obtained by choosing the amount of the threshold shift. However, the property of the diameters varying together as a function display intensity and distance is obtained by assuring that the family of optical attenuation curves 9 and 120 are raised sinusoids. It can be shown that when the persistence of the phosphor in the CRT is long in comparison to the time required to sweep across the field of view, and that when the intersection of the viewing region and the image surface of the CRT is a circle, a necessary condition for the equal variation in the diameters of the single dot and horizontal line fields of view is that the optical attenuation curve for the light pen be a raised sinusoid.

What is claimed is:

1. A light pen system comprising:
    CRT display means for displaying frames of luminous information upon a screen, portions of which luminous information are to be detected by a light pen;
    photoelectric detection means positionable proximate the screen and responsive to light therefrom for providing an electrical output signal whose amplitude is indicative of the amount of light reaching the photoelectric detection means; and
    variable threshold means responsive to the electric output signal for producing a detection signal at first times during a frame whenever the electrical output signal corresponding to a first portion of the luminous information exceeds a first amplitude and for selectedly producing the detection signal at second times during the same frame whenever the electrical output signal corresponding to a second portion of the luminous information exceeds a second amplitude.

2. A light pen system as in claim 1 wherein the second amplitude is greater than the first amplitude and wherein the variable threshold means invokes the second amplitude whenever the CRT is writing a selected line segment.

3. A light pen system as in claim 2 wherein the CRT display means comprises a raster scan display and the selected line segment is a continuous portion of a scan line.

4. A light pen system comprising:
raster scan CRT display means for displaying frames of information upon a screen;
photoelectric detection means positionable proximate the screen and responsive to light received therefrom for producing an electrical output signal indicative of light received by the photoelectric detection means;
cursor generation means coupled to the raster scan CRT display means for generating a cursor image at a selected location of the screen;
interlacing means responsive to the cursor generation means, for generating a less than raster-sized region of interlacing surrounding the cursor within which the cursor image is displayed in full during each frame and within which other information on successive alternate scan lines is blanked during alternate frames;
logic means responsive to the photoelectric detection means and to the interlacing means for identifying electrical output signals from the photoelectric detection means occurring on alternate frames during portions of the successive alternate scan lines within the region of interlacing, thereby identifying electrical output signals corresponding to the cursor image.

5. A light pen system comprising:
raster scan CRT display means for displaying frames of information upon a screen;
photoelectric detection means positionable proximate the screen and responsive to light received therefrom for producing an electrical output signal indicative of light received by the photoelectric detection means;
cursor generation means coupled to the raster scan CRT display means for generating a cursor image at a selected location of the screen;
interlacing means responsive to the cursor generation means, for generating a less than raster-sized region of interlacing surrounding the cursor within which the cursor image is displayed in full during each frame, within which other information on successive alternate scan lines is blanked during alternate frames and within which other information on successive intervening scan lines is blanked during intervening frames; and
logic means responsive to the photoelectric detection means and to the interlacing means for identifying electrical output signals from the photoelectric detection means occurring on alternate frames during portions of the successive alternate scan lines within the region of interlacing and for identifying electrical output signals occurring on intervening frames during portions of the successive intervening scan lines within the region of interlacing, thereby identifying electrical output signals corresponding to the cursor image.

6. A light pen system as in claims 4 or 5 further comprising coordinate means responsive to the logic means and to the photoelectric detection means, for determining the coordinates of locations upon the cursor image from those electrical output signals from the photoelectric detection means identified as corresponding to the cursor image.

7. A light pen system as in claim 6 further comprising center estimation means responsive to the coordinate means, for estimating the coordinates of the center of the field of view for the photoelectric detection means.

8. A light pen system as in claim 7 wherein the cursor generation means is responsive to the center estimation means by generating a subsequent cursor image at a location derived from coordinates previously determined by the center estimation means.

9. A light pen system as in claim 4 or 5 wherein the cursor image has the shape of two perpendicular straight line segments intersecting at their midpoints, one of the line segments being parallel to the scan lines of the raster, and each of the line segments being longer than the size of the field of view of the photoelectric detection means and further wherein the region of interlacing is a rectangle centered upon the intersection of the straight line segments, one side of the rectangle being parallel and equal in length to one of the straight line segments, and an adjacent side of the rectangle being parallel and equal in length to the other straight line segment.

10. A method of identifying from a photoelectric sensor optically coupled to a raster scan CRT electrical outputs corresponding to a first image displayed in arbitrary spatial relation to other images, the method comprising the steps of:
displaying during each frame of the raster the entire first image;
blanking those portions of the other images occurring on portions of successive alternate scan lines within a less than raster-sized region of interlacing containing the first image; and
detecting electrical outputs from the photoelectric sensor occurring during the blanking step.

11. A light pen system comprising:
raster scan CRT display means for displaying frames of information upon a screen;
photoelectric detection means positionable proximate the screen and responsive to light received therefrom for producing an electrical output signal indicative of light received by the photoelectric detection means;
cursor generation means coupled to the raster scan CRT display means for generating a cursor image at a selected location of the screen;
interlacing means for establishing a less than raster-sized region of interlacing within which the full cursor image is solitarily displayed during alternate frames and other information is displayed during intervening frames; and
coordinate means responsive to the photoelectric detection means and to the interlacing means, for determining from electrical output signals from the photoelectric detection means occurring during the alternate frames the coordinates of locations upon the cursor image.

12. A light pen system as in claim 11 further comprising center estimation means responsive to the coordinate means, for estimating the coordinates of the center of the field of view for the photoelectric detection means.

13. A light pen system as in claim 12 wherein the cursor generation means is responsive to the center estimation means by generating a subsequent cursor image at a location derived from coordinates previously determined by the center estimation means.

14. A light pen system as in claim 11 wherein the cursor image has the shape of two perpendicular straight line segments intersecting at their midpoints, one of the line segments being parallel to the scan lines of the raster, and each of the line segments being longer than the size of the field of view of the photoelectric detection means.

15. A method of identifying from a photoelectric sensor optically coupled to a raster scan CRT electrical outputs corresponding to a first image displayed in arbitrary spatial relation to other images, the method comprising the steps of:
   solitarily displaying the entire first image within a less than raster-sized region of interlacing during alternate frames of the raster;
   displaying the other images in full during intervening frames of the raster; and
   detecting electrical outputs from the photoelectric sensor occurring during alternate frames.

16. A method of correlating a coordinate measured upon the screen of a display using the single dot field of view of a photoelectric sensor with a coordinate measuring using the horizontal line field of view, the method comprising the steps of:
   positioning the photoelectric sensor proximate the screen of the display;
   detecting in an electrical signal from the photoelectric sensor a first excursion exceeding a first threshold;
   converting the first excursion into a first displacement value;
   detecting in the electrical signal from the photoelectric sensor a second excursion exceeding a second threshold greater than the first threshold;
   converting the second excursion into a second displacement value; and
   adjusting the second displacement value by a selected amount corresponding to the spatial displacement between the single dot and horizontal line fields of view.

17. A method as in claim 16 wherein the degree by which the second threshold exceeds the first threshold is selected to make the radius of curvature for the horizontal line field of view approximate the radius of curvature for the single dot field of view.

18. A method as in claim 17 further comprising the step of attenuating the amount of light reaching the photoelectric sensor according to a raised sinusoidal function of the distance from a point on the screen of the display to the intersection of an optical axis of the photoelectric sensor and the screen.

19. A method as in claims 16, 17 or 18 wherein the display comprises a raster scan display.

20. A method for estimating the location of the center of the field of view for a photoelectric sensor optically coupled to a raster scan display, the method comprising the steps of:
   displaying a cursor image having both a component parallel to the raster scan lines and a component non-parallel to the raster scan lines;
   optically coupling the cursor image to a photoelectric sensor producing an output signal whose amplitude is indicative of the amount of light coupled thereto;
   detecting with a first threshold a first output signal indicative of the intersection of a first field of view and the non-parallel component of the cursor image;
   detecting with a second threshold higher than the first threshold a second output signal indicative of the intersection of a second field of view and the parallel component of the cursor image;
   detecting a third output indicative of the intersection of another cursor image component with the field of view of the photoelectric sensor;
   converting the first, second and third detected outputs to first, second and third displacement values each corresponding to a displacement along a respectively associated scan line;
   adjusting at least one of the first, second and third displacement values to compensate for the offset in the second displacement value relative to the first displacement value produced by the increase in the second threshold over the first threshold; and
   estimating the center of the field of view from the adjusted first, second and third displacement values and the ordinal values of the scan lines associated therewith.

21. A method as in claim 20 further comprising the step of predicting based on past location information the future location of the center of the field of view and wherein the displaying step includes displaying the cursor image at the predicted location.

22. A light pen system as in claim 2 wherein the CRT display means comprises a raster scan display, the second amplitude is greater than the first amplitude, and wherein the variable threshold means invokes the second amplitude whenever a selected scan line of the raster is being written.

23. A method as in claim 20 or 21 wherein the difference between the first and second thresholds is selected to produce equal radii of curvature in the first and second fields of view.

24. A light pen system as in claim 2 or claim 3 wherein the selected line segment is a portion of a cursor image.

* * * * *

UNITED STATES PATENT AND TRADEMARK OFFICE
CERTIFICATE OF CORRECTION

PATENT NO. : 4,367,465

DATED : January 4, 1983

INVENTOR(S) : Nicholas P. Mati et al

It is certified that error appears in the above—identified patent and that said Letters Patent is hereby corrected as shown below:

Column 5, line 68, "CRt" should be --CRT--;

Column 7, line 35, "202" should be --102--;

Column 10, line 10, "signal" should be --single--;

Column 13, line 43, "HIt" should be --HIT--;

Column 21, lines 25-26, "measuring" should be --measured--;

Column 22, line 42, "2" should be --1--.

Signed and Sealed this

Fifth Day of April 1983

[SEAL]

Attest:

GERALD J. MOSSINGHOFF

Attesting Officer    Commissioner of Patents and Trademarks